US012670665B2

(12) United States Patent
Xu et al.

(10) Patent No.: US 12,670,665 B2
(45) Date of Patent: Jun. 30, 2026

(54) OBJECT RECONSTRUCTION METHOD AND RELATED DEVICE

(71) Applicant: Huawei Technologies Co., Ltd., Shenzhen (CN)

(72) Inventors: Ziya Xu, Shenzhen (CN); Xu Cheng, Shenzhen (CN); Wenchao Sun, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 259 days.

(21) Appl. No.: 18/411,358

(22) Filed: Jan. 12, 2024

(65) Prior Publication Data

US 2024/0153209 A1 May 9, 2024

Related U.S. Application Data

(63) Continuation of application No. PCT/CN2022/105108, filed on Jul. 12, 2022.

(30) Foreign Application Priority Data

Jul. 15, 2021 (CN) .......................... 202110803193.4

(51) Int. Cl.
*G06T 17/20* (2006.01)
*G06T 7/73* (2017.01)
(52) U.S. Cl.
CPC ............... *G06T 17/20* (2013.01); *G06T 7/74* (2017.01); *G06T 2207/10028* (2013.01);
(Continued)

(58) Field of Classification Search
None
See application file for complete search history.

(56) References Cited

U.S. PATENT DOCUMENTS

| | | | | |
|---|---|---|---|---|
| 2004/0189686 A1* | 9/2004 | Tanguay, Jr. | ........ | G06F 15/7867 |
| | | | | 345/420 |
| 2017/0251143 A1* | 8/2017 | Peruch | ................. | H04N 13/243 |

(Continued)

FOREIGN PATENT DOCUMENTS

| | | |
|---|---|---|
| CN | 108876828 A | 11/2018 |
| CN | 112733579 A | 4/2021 |

OTHER PUBLICATIONS

Patents Assigned to Vangogh Imaging, Inc, Available for download Dec. 3, 2024, [online]https://patents.justia.com/assignee/vangogh-imaging-inc, total 10 pages.

(Continued)

*Primary Examiner* — Frank S Chen
(74) *Attorney, Agent, or Firm* — Conley Rose, P.C.

(57) ABSTRACT

An object reconstruction method includes obtaining a plurality of target images and real poses corresponding to a case in which a camera captures the target images. Based on the target images and the real poses, a sparse point cloud whose size is consistent with a real size of a target object is constructed and a three-dimensional (3D) model of the target object is generated based on the sparse point cloud. A distribution size of the sparse point cloud generated based on the first poses is consistent with the real size of the target object such that the reconstructed 3D model is more realistic, and does not include a size distortion.

20 Claims, 11 Drawing Sheets

(52) U.S. Cl.
CPC .............. *G06T 2207/20092* (2013.01); *G06T 2207/30244* (2013.01); *G06T 2210/12* (2013.01); *G06T 2210/56* (2013.01)

(56) References Cited

U.S. PATENT DOCUMENTS

| | | | |
|---|---|---|---|
| 2018/0112978 A1* | 4/2018 | Burton ................. | G01C 11/025 |
| 2020/0074658 A1* | 3/2020 | Yu ........................... | G06T 7/557 |
| 2020/0162629 A1 | 5/2020 | Ilic et al. | |
| 2022/0301277 A1* | 9/2022 | Xu ....................... | G06V 10/255 |

OTHER PUBLICATIONS

RealityCapture—3D Models from Photos and/or Laser Scans, Create realistic 3D models from photos, download on Dec. 30, 2024, [online]https://www.capturingreality.com/, total 7 pages.

* cited by examiner

Terminal 100                    Server 200

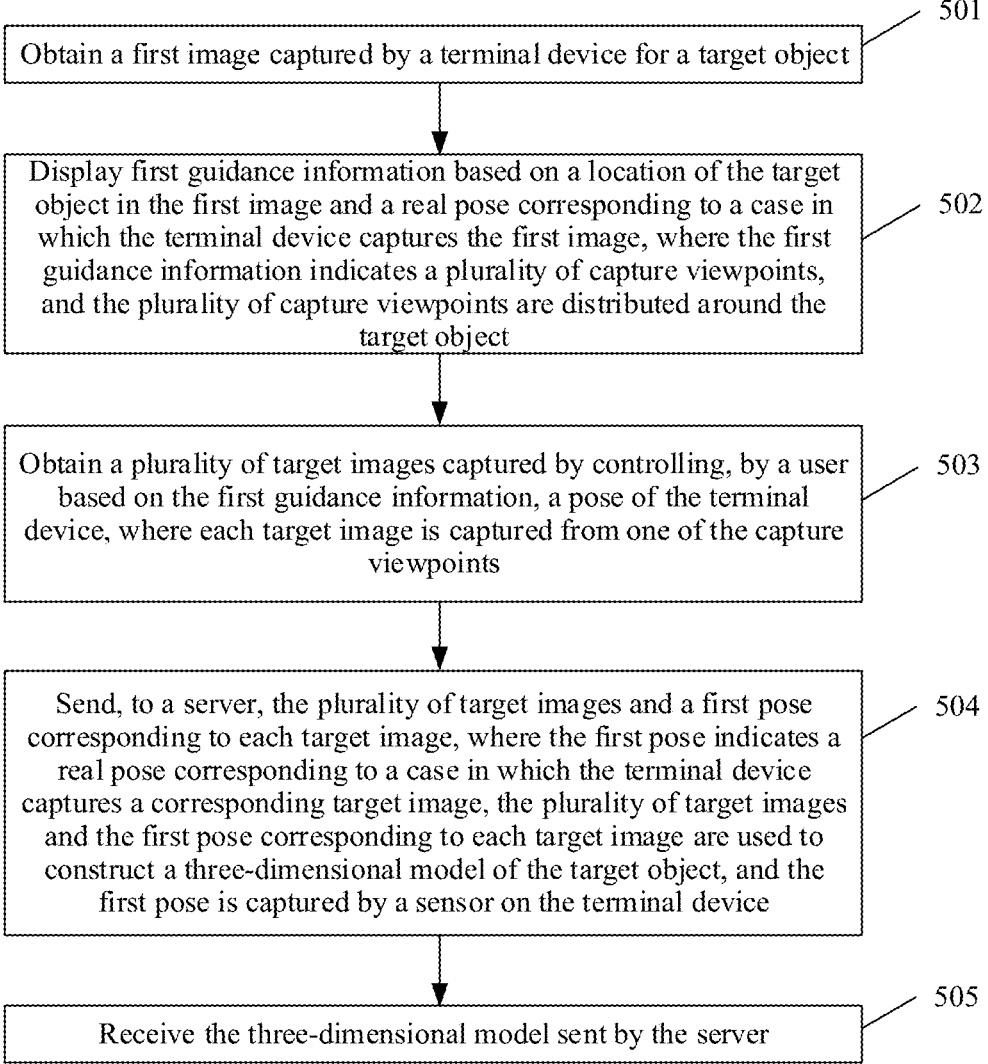

Obtain a first image captured by a terminal device for a target object ⟋ 501

Display first guidance information based on a location of the target object in the first image and a real pose corresponding to a case in which the terminal device captures the first image, where the first guidance information indicates a plurality of capture viewpoints, and the plurality of capture viewpoints are distributed around the target object ⟋ 502

Obtain a plurality of target images captured by controlling, by a user based on the first guidance information, a pose of the terminal device, where each target image is captured from one of the capture viewpoints ⟋ 503

Send, to a server, the plurality of target images and a first pose corresponding to each target image, where the first pose indicates a real pose corresponding to a case in which the terminal device captures a corresponding target image, the plurality of target images and the first pose corresponding to each target image are used to construct a three-dimensional model of the target object, and the first pose is captured by a sensor on the terminal device ⟋ 504

Receive the three-dimensional model sent by the server ⟋ 505

FIG. 5

$0^{th}$ frame

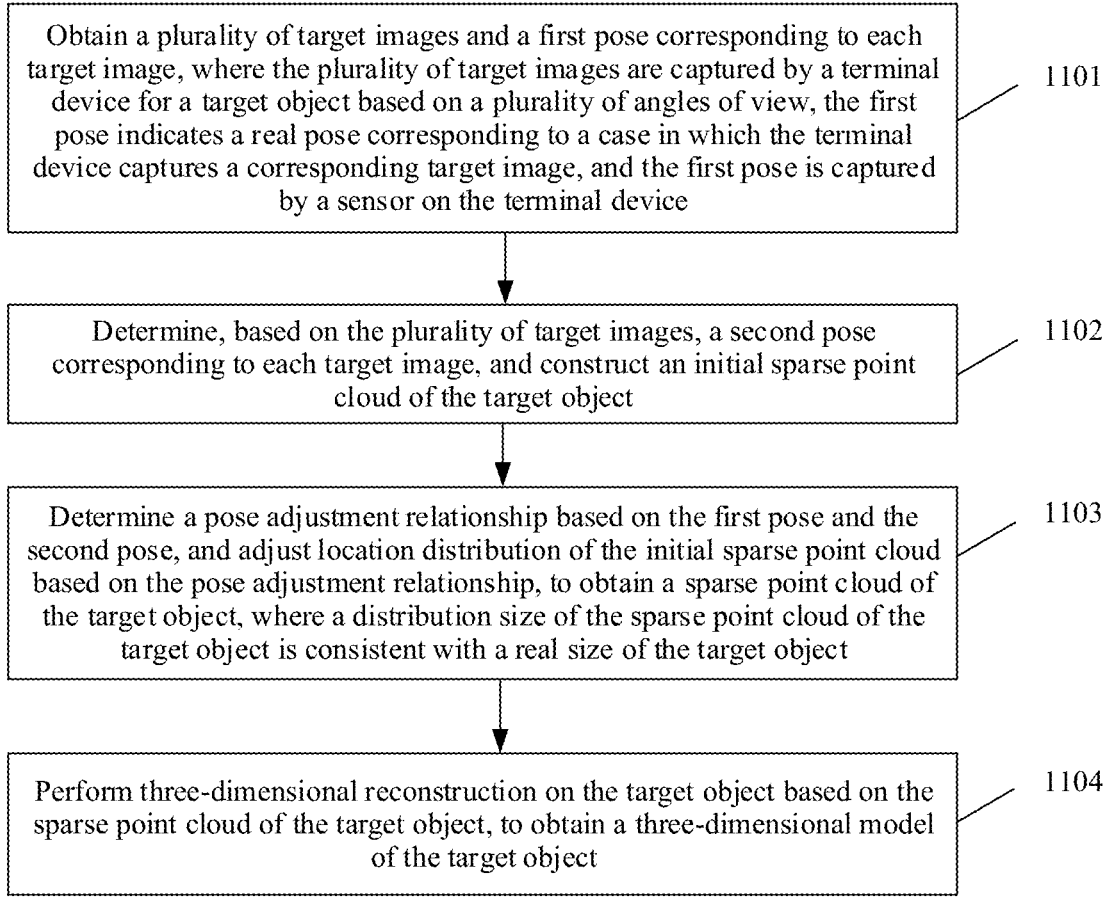

Obtain a plurality of target images and a first pose corresponding to each target image, where the plurality of target images are captured by a terminal device for a target object based on a plurality of angles of view, the first pose indicates a real pose corresponding to a case in which the terminal device captures a corresponding target image, and the first pose is captured by a sensor on the terminal device    1101

Determine, based on the plurality of target images, a second pose corresponding to each target image, and construct an initial sparse point cloud of the target object    1102

Determine a pose adjustment relationship based on the first pose and the second pose, and adjust location distribution of the initial sparse point cloud based on the pose adjustment relationship, to obtain a sparse point cloud of the target object, where a distribution size of the sparse point cloud of the target object is consistent with a real size of the target object    1103

Perform three-dimensional reconstruction on the target object based on the sparse point cloud of the target object, to obtain a three-dimensional model of the target object    1104

FIG. 11

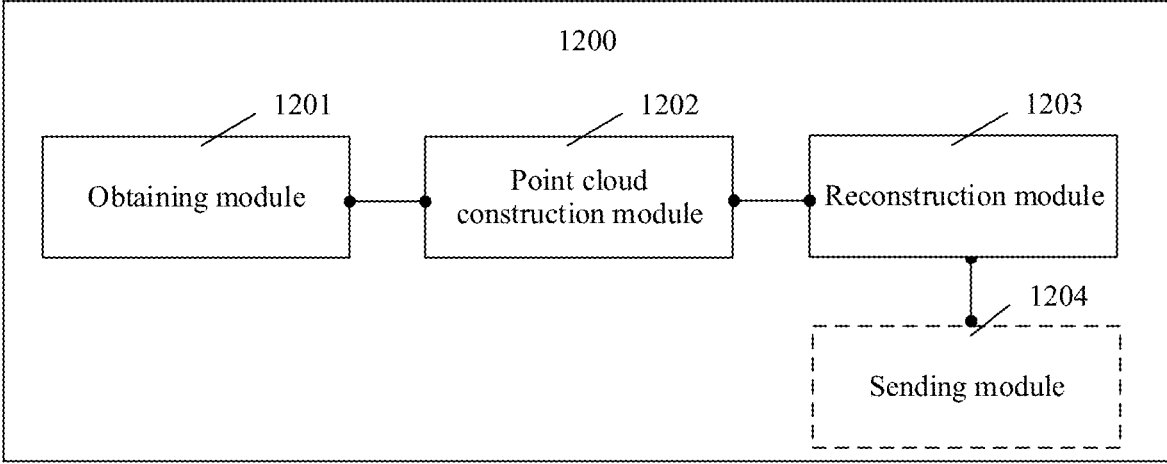

1200

1201

Obtaining module

1202

Point cloud construction module

1203

Reconstruction module

1204

Sending module

FIG. 12

OBJECT RECONSTRUCTION METHOD AND RELATED DEVICE

CROSS-REFERENCE TO RELATED APPLICATIONS

This is a continuation of International Patent Application No. PCT/CN2022/105108 filed on Jul. 12, 2022, which claims priority to Chinese Patent Application No. 202110803193.4 filed on Jul. 15, 2021. The disclosures of the aforementioned applications are hereby incorporated by reference in their entireties.

TECHNICAL FIELD

This disclosure relates to the image processing field, and in particular, to an object reconstruction method and a related device.

BACKGROUND

Object reconstruction is widely applied to the fields of computer graphics and computer vision. For example, object reconstruction is applied to special effects of films, three-dimensional (3D) stereo image games, virtual reality, and human machine interaction. With popularization of 3D cameras, there are more applications (APPs) related to object reconstruction. For example, a doll is scanned by using a camera on a terminal device, and the doll is reconstructed based on image data obtained through scanning, to obtain a 3D model of the doll. Then, the doll is reproduced in an APP.

An object reconstruction method may be implemented on a terminal side or a cloud side. A solution performed completely on the terminal side is limited by computing power of the terminal side, and high-precision object reconstruction cannot be implemented. An object reconstruction method on the cloud side is implemented based on feature matching and the like of images, and an object model with a high reproduction degree cannot be reconstructed.

SUMMARY

Embodiments of this disclosure provide an object reconstruction method, so that a reconstructed 3D model is more realistic, and no size distortion occurs.

According to a first aspect, this disclosure provides an object reconstruction method. The method includes obtaining a plurality of target images and a first pose corresponding to each target image, where the plurality of target images is captured by a terminal device for a target object based on a plurality of angles of view, the first pose indicates a real pose corresponding to a case in which the terminal device captures a corresponding target image, and the first pose is captured by a sensor on the terminal device. The term "pose" includes a location and a posture. If a camera moves in a plane, a location of the camera may be described by using two-dimensional (2D) coordinates, and a posture of the camera may be described by using a rotation angle θ. If the camera moves in 3D space, a location of the camera may be described by using 3D coordinates, and a posture of the camera may be described in a plurality of manners. Common manners are, for example, Euler angles, a quaternion, and a rotation matrix. The plurality of angles of view are angles of view around the target object or a subset of angles of view around the target object.

The method further includes determining, based on the plurality of target images, a second pose corresponding to each target image, and constructing an initial sparse point cloud of the target object, determining a pose adjustment relationship based on the first pose and the second pose, and adjusting location distribution of the initial sparse point cloud based on the pose adjustment relationship, to obtain a sparse point cloud of the target object, where a distribution size of the sparse point cloud of the target object is consistent with a real size of the target object, and performing 3D reconstruction on the target object based on the sparse point cloud, to obtain a 3D model of the target object.

This embodiment of this disclosure provides the object reconstruction method. The method includes obtaining the plurality of target images and the first pose corresponding to each target image, where the plurality of target images are captured by the terminal device for the target object based on the plurality of angles of view, the first pose indicates the real pose corresponding to a case in which the terminal device captures the corresponding target image, and the first pose is captured by the sensor on the terminal device, determining, based on the plurality of target images, the second pose corresponding to each target image, and constructing the initial sparse point cloud of the target object, determining the pose adjustment relationship based on the first pose and the second pose, and adjusting location distribution of the initial sparse point cloud based on the pose adjustment relationship, to obtain the sparse point cloud of the target object, where the distribution size of the sparse point cloud of the target object is consistent with the real size of the target object, and performing 3D reconstruction on the target object based on the sparse point cloud of the target object, to obtain the 3D model of the target object. According to the method, the distribution size of the sparse point cloud generated based on the first pose is consistent with the real size of the target object, so that the reconstructed 3D model is more realistic, and no size distortion occurs.

In a possible implementation, obtaining a plurality of target images and a first pose corresponding to each target image includes receiving the plurality of target images and the first pose corresponding to each target image that are sent by the terminal device.

In a possible implementation, the method further includes sending the 3D model of the target object to the terminal device.

In a possible implementation, the sensor is an inertial sensor such as an inertial measurement unit (IMU).

In a possible implementation, before constructing an initial sparse point cloud of the target object, the method further includes determining a pose association relationship between the plurality of target images based on the first pose corresponding to the target image, where a difference between real poses corresponding to a case in which the terminal device captures the plurality of target images between which there is the pose association relationship is less than a threshold, and constructing an initial sparse point cloud of the target object includes constructing the initial sparse point cloud of the target object through feature point matching based on images that are in the plurality of target images and between which there is the pose association relationship.

In a possible implementation, before constructing an initial sparse point cloud of the target object, the method further includes receiving a pose association relationship between the plurality of target images that is sent by the terminal device, where a difference between real poses corresponding to a case in which the terminal device captures the plurality of target images between which there is the pose association relationship is less than a threshold, and constructing an initial sparse point cloud of the target object based on the plurality of target images includes constructing the initial sparse point cloud of the target object through feature point matching based on images that are in the plurality of target images and between which there is the pose association relationship.

In some scenarios, because there are a plurality of local areas on the target object, and materials and texture features of the plurality of local areas are similar, target images obtained by capturing these local areas are similar. After feature matching is performed, it may be considered that there is a pose association relationship between these target images, and specific distortion may occur on the sparse point cloud that is of the target object and that is constructed based on these target images.

In this embodiment of this disclosure, the pose association relationship between the plurality of target images may be determined based on the first pose, where a difference between real poses corresponding to a case in which the camera captures the plurality of target images between which there is the pose association relationship is less than a threshold. Because the first pose can express a real pose relationship between the images, a pose association relationship is not established between target images with similar textures when a pose difference is large. This avoids matching of non-adjacent frames. That is, an error on the pose association relationship caused by the foregoing similar textures is avoided.

In some scenarios, there is a local area with a small quantity of textures on the target object. In this case, in establishment of a pose association relationship between the target image including the local area with a small quantity of textures and another target image, because the target image includes the local area with a small quantity of textures, the pose association relationship between the target image and the another target image may not be accurately determined, or the pose association relationship cannot be determined.

In this embodiment of this disclosure, the pose association relationship between the plurality of target images may be determined based on the first pose, where a difference between real poses corresponding to a case in which the camera captures the plurality of target images between which there is the pose association relationship is less than a threshold. Because the first pose can express a real pose relationship between the images, a pose association relationship can be established for a target image with a small pose difference, even if a local area with a small quantity of textures is included. This further increases a capability of resisting a weak texture.

In a possible implementation, to ensure integrity of a subsequently reconstructed target object, the plurality of selected target images need to cover all local areas of the target object. To be specific, the plurality of selected target images need to meet a condition that angle-of-view coverage for the target object is greater than a threshold. The threshold may be a ratio of a size of an angle-of-view coverage area of the target object to a size of a surface area of the target object. For example, the threshold may be, but is not limited to, 95%, 96%, 99%, or 100%. It should be understood that, in some scenarios, only a part of an area on the target object is visible due to existence of an obstacle (for example, a ground). In this case, the threshold is a ratio of the size of the angle-of-view coverage area of the target object to a size of a visible surface area of the target object.

In a possible implementation, in the plurality of images captured by the camera, there is a large degree of angle-ofview overlap between a large quantity of images for the target object. To reduce a quantity of selected images, an image frame is selected from the images between which there is a large degree of angle-of-view overlap. For example, the image frame may be extracted from an original image sequence based on spatial location distribution of image frames (for example, when a frame spacing between a current image and a previous frame of key image is greater than a specific distance, the current image is selected as the target image), or the image frame may be extracted from an original image sequence based on a time interval (for example, for an image sequence of 30 frames per second, a frame is selected as the target image at an interval of 15 frames (namely, 0.5 second)).

In a possible implementation, the first guidance information may be displayed on a photographing interface to guide the user to capture the target images whose angle-of-view coverage for the target object is greater than a threshold, and whose degrees of angle-of-view overlap between different capture viewpoints are less than a threshold. The first guidance information indicates the plurality of capture viewpoints, and the plurality of capture viewpoints are distributed around the target object. The plurality of capture viewpoints may meet at least one of the following conditions. Angle-of-view coverage of the plurality of capture viewpoints for the target object is greater than a threshold, and a degree of angle-of-view overlap between different capture viewpoints in the plurality of capture viewpoints is less than a threshold, for example, may be less than 95%, 96%, 90%, or the like, and the degree of angle-of-view overlap between different capture viewpoints in the plurality of capture viewpoints is greater than a threshold, for example, may be greater than 75%, 76%, 70%, or the like. Further, target images photographed by the user from the foregoing capture viewpoints also accordingly meet a condition that an angle-of-view coverage for the target object is greater than a threshold, and/or a condition that a degree of angle-of-view overlap between different target images is less than a threshold.

According to a second aspect, this disclosure provides an object reconstruction method. The method is applied to a terminal device. The method includes obtaining a first image captured by the terminal device for a target object, displaying first guidance information based on a location of the target object in the first image and a real pose corresponding to a case in which the terminal device captures the first image, where the first guidance information indicates a plurality of capture viewpoints, and the plurality of capture viewpoints are distributed around the target object, obtaining a plurality of target images obtained by controlling, by a user based on the first guidance information, a pose of the terminal device, where each target image is captured from one of the capture viewpoints, and sending, to a server, the plurality of target images and a first pose corresponding to each target image, where the first pose indicates a real pose corresponding to a case in which the terminal device captures a corresponding target image, the plurality of target images and the first pose corresponding to each target image are used to construct a 3D model of the target object, and the first pose is captured by a sensor on the terminal device.

The first guidance information may be displayed on a photographing interface to guide the user to capture the target images whose angle-of-view coverage for the target object is greater than a threshold, and whose degrees of angle-of-view overlap between different capture viewpoints are less than a threshold. The first guidance information indicates the plurality of capture viewpoints, and the plurality of capture viewpoints are distributed around the target object. The plurality of capture viewpoints may meet at least one of the following conditions. Angle-of-view coverage of the plurality of capture viewpoints for the target object is greater than a threshold, and a degree of angle-of-view overlap between different capture viewpoints in the plurality of capture viewpoints is less than a threshold, for example, may be less than 95%, 96%, 90%, or the like, and the degree of angle-of-view overlap between different capture viewpoints in the plurality of capture viewpoints is greater than a threshold, for example, may be greater than 75%, 76%, 70%, or the like. Further, target images photographed by the user from the foregoing capture viewpoints also accordingly meet a condition that an angle-of-view coverage for the target object is greater than a threshold, and/or a condition that a degree of angle-of-view overlap between different target images is less than a threshold.

In a possible implementation, to ensure integrity of a subsequently reconstructed target object, the plurality of selected target images need to cover all local areas of the target object. To be specific, the plurality of selected target images need to meet a condition that angle-of-view coverage for the target object is greater than a threshold. The threshold may be a ratio of a size of an angle-of-view coverage area of the target object to a size of a surface area of the target object. For example, the threshold may be, but is not limited to, 95%, 96%, 99%, or 100%. It should be understood that, in some scenarios, only a part of an area on the target object is visible due to existence of an obstacle (for example, a ground). In this case, the threshold is a ratio of the size of the angle-of-view coverage area of the target object to a size of a visible surface area of the target object.

In a possible implementation, the sensor is an inertial sensor IMU.

In a possible implementation, in the plurality of images captured by the camera, there is a large degree of angle-of-view overlap between a large quantity of images for the target object. To reduce a quantity of selected images, an image frame is selected from the images between which there is a large degree of angle-of-view overlap. For example, the image frame may be extracted from an original image sequence based on spatial location distribution of image frames (for example, when a frame spacing between a current image and a previous frame of key image is greater than a specific distance, the current image is selected as the target image), or the image frame may be extracted from an original image sequence based on a time interval (for example, for an image sequence of 30 frames per second, a frame is selected as the target image at an interval of 15 frames (namely, 0.5 second)).

In a possible implementation, the method further includes determining a pose association relationship between the plurality of target images based on the first pose corresponding to each target image, where a difference between real poses corresponding to a case in which the camera captures the plurality of target images between which there is the pose association relationship is less than a threshold, and sending the pose association relationship between the plurality of target images to the server, where the pose association relationship between the plurality of target images is used to construct the 3D model of the target object.

According to a third aspect, this disclosure provides an object reconstruction apparatus. The apparatus includes an obtaining module configured to obtain a plurality of target images and a first pose corresponding to each target image, where the plurality of target images are captured by a terminal device for a target object based on a plurality of angles of view, the first pose indicates a real pose corresponding to a case in which the terminal device captures a corresponding target image, and the first pose is captured by a sensor on the terminal device, a point cloud construction module configured to determine, based on the plurality of target images, a second pose corresponding to each target image, and construct an initial sparse point cloud of the target object, and determine a pose adjustment relationship based on the first pose and the second pose, and adjust location distribution of the initial sparse point cloud based on the pose adjustment relationship, to obtain a sparse point cloud of the target object, where a distribution size of the sparse point cloud of the target object is consistent with a real size of the target object, and a reconstruction module configured to perform 3D reconstruction on the target object based on the sparse point cloud of the target object, to obtain a 3D model of the target object.

In a possible implementation, the obtaining module is further configured to receive the plurality of target images and the first pose corresponding to each target image that are sent by the terminal device.

In a possible implementation, the apparatus further includes a sending module configured to send the 3D model of the target object to the terminal device.

In a possible implementation, the sensor is an inertial sensor IMU.

In a possible implementation, the obtaining module is further configured to, before the constructing an initial sparse point cloud of the target object, determine a pose association relationship between the plurality of target images based on the first pose corresponding to the target image, where a difference between real poses corresponding to a case in which the terminal device captures the plurality of target images between which there is the pose association relationship is less than a threshold.

The point cloud construction module is further configured to construct the initial sparse point cloud of the target object through feature point matching based on images that are in the plurality of target images and between which there is the pose association relationship.

In a possible implementation, the obtaining module is further configured to, before the constructing an initial sparse point cloud of the target object, receive a pose association relationship between the plurality of target images that is sent by the terminal device, where a difference between real poses corresponding to a case in which the terminal device captures the plurality of target images between which there is the pose association relationship is less than a threshold.

The point cloud construction module is further configured to construct the initial sparse point cloud of the target object through feature point matching based on images that are in the plurality of target images and between which there is the pose association relationship.

In a possible implementation, the plurality of target images meets at least one of the following conditions.

Angle-of-view coverage of the plurality of target images for the target object is greater than a threshold, a degree of angle-of-view overlap between different target images in the plurality of target images is less than a threshold, and image definition of the plurality of target images is greater than a threshold.

According to a fourth aspect, this disclosure provides an object reconstruction apparatus. The apparatus is used in a terminal device, and the terminal device includes a camera. The apparatus includes an obtaining module configured to obtain a first image captured by the terminal device for a target object, and obtain a plurality of target images captured by controlling, by a user based on first guidance information displayed by a display module, a pose of the terminal device, where each target image is captured from one of capture viewpoints, the display module configured to display the first guidance information based on a location of the target object in the first image and a real pose corresponding to a case in which the terminal device captures the first image, where the first guidance information indicates a plurality of capture viewpoints, and the plurality of capture viewpoints are distributed around the target object, a sending module configured to send, to a server, the plurality of target images and a first pose corresponding to each target image, where the first pose indicates a real pose corresponding to a case in which the terminal device captures a corresponding target image, the plurality of target images and the first pose corresponding to each target image are used to construct a 3D model of the target object, and the first pose is captured by a sensor on the terminal device, and a receiving module configured to receive the 3D model sent by the server.

In a possible implementation, the sensor is an inertial sensor IMU.

In a possible implementation, the plurality of capture viewpoints meets at least one of the following conditions.

Angle-of-view coverage of the plurality of capture viewpoints for the target object is greater than a threshold, and a degree of angle-of-view overlap between different capture viewpoints in the plurality of capture viewpoints is less than a threshold.

In a possible implementation, the obtaining module is further configured to determine a pose association relationship between the plurality of target images based on the first pose corresponding to each target image, where a difference between real poses corresponding to a case in which the camera captures the plurality of target images between which there is the pose association relationship is less than a threshold.

The sending module is further configured to send the pose association relationship between the plurality of target images to the server, where the pose association relationship between the plurality of target images is used to construct the 3D model of the target object.

According to a fifth aspect, this disclosure provides an object reconstruction apparatus, including a processor, a memory, and a bus. The processor, the memory, and the camera are connected through the bus.

The memory is configured to store a computer program or instructions.

The processor is configured to invoke or execute the program or the instructions stored in the memory, to implement the steps according to any one of the first aspect and the possible implementations of the first aspect.

According to a sixth aspect, this disclosure provides an object reconstruction apparatus, including a processor, a memory, a camera, and a bus. The processor, the memory, and the camera are connected through the bus, the camera is configured to capture a video in real time, the memory is configured to store a computer program or instructions, and the processor is configured to invoke or execute the program or the instructions stored in the memory, and is further configured to invoke the camera, to implement the steps according to any one of the second aspect and the possible implementations of the second aspect.

According to a seventh aspect, this disclosure provides a computer storage medium including computer instructions. When the computer instructions are run on an electronic device or a server, the steps according to any one of the first aspect and the possible implementations of the first aspect and the steps according to any one of the second aspect and the possible implementations of the second aspect are performed.

According to an eighth aspect, this disclosure provides a computer program product. When the computer program product runs on an electronic device or a server, the steps according to any one of the first aspect and the possible implementations of the first aspect and the steps according to any one of the second aspect and the possible implementations of the second aspect are performed.

According to a ninth aspect, this disclosure provides a chip system. The chip system includes a processor configured to support an execution device or a training device in implementing a function in the foregoing aspects, for example, sending or processing data or information in the foregoing method. In a possible design, the chip system further includes a memory. The memory is configured to store program instructions and data that are necessary for the execution device or the training device. The chip system may include a chip, or may include a chip and another discrete component.

Embodiments of this disclosure provide an object reconstruction method. The method includes obtaining the plurality of target images and the first pose corresponding to each target image, where the plurality of target images are captured by the terminal device for the target object based on the plurality of angles of view, the first pose indicates the real pose corresponding to a case in which the terminal device captures the corresponding target image, and the first pose is captured by the sensor on the terminal device, determining, based on the plurality of target images, the second pose corresponding to each target image, and constructing the initial sparse point cloud of the target object, determining the pose adjustment relationship based on the first pose and the second pose, and adjusting location distribution of the initial sparse point cloud based on the pose adjustment relationship, to obtain the sparse point cloud of the target object, where the distribution size of the sparse point cloud of the target object is consistent with the real size of the target object, and performing 3D reconstruction on the target object based on the sparse point cloud of the target object, to obtain the 3D model of the target object. According to the method, the distribution size of the sparse point cloud generated based on the first pose is consistent with the real size of the target object, so that the reconstructed 3D model is more realistic, and no size distortion occurs.

In addition, a user can perform object modeling by using a terminal (for example, a common mobile phone) that has a real pose identification capability, without special hardware such as red, green, and blue with depth (RGB-D) or light detection and ranging (LiDAR) sensors. Simple integration can be used to implement capabilities such as data collection and uploading, and model download and preview.

In addition, a 3D geometric model and a texture of the object can be automatically generated by photographing a plurality of images of the object at different angles.

In addition, a 3D model or a physically-based rendering (PBR) material map can be obtained through simple photographing, to implement "What you see is what you get".

BRIEF DESCRIPTION OF DRAWINGS

FIG. 5 is a schematic diagram of an embodiment of an object reconstruction method according to an embodiment of this disclosure;

FIG. 11 is a schematic diagram of an embodiment of an object reconstruction method according to an embodiment of this disclosure;

FIG. 12 is a schematic diagram of a structure of an object reconstruction apparatus according to an embodiment of this disclosure;

DESCRIPTION OF EMBODIMENTS

The following describes embodiments of the present disclosure with reference to accompanying drawings in embodiments of the present disclosure. Terms used in embodiments of the present disclosure are merely used to explain specific embodiments of the present disclosure, but are not intended to limit the present disclosure.

The following describes embodiments of this disclosure with reference to the accompanying drawings. A person of ordinary skill in the art may learn that, with development of technologies and emergence of new scenarios, the technical solutions provided in embodiments of this disclosure are also applicable to a similar technical problem.

In the specification, claims, and the accompanying drawings of this disclosure, the terms "first", "second", and the like are intended to distinguish between similar objects but do not necessarily indicate a specific order or sequence. It should be understood that the terms used in such a way are interchangeable in appropriate circumstances, and this is merely a discrimination manner for describing objects having a same attribute in embodiments of this disclosure. In addition, the terms "include", "contain" and any other variants mean to cover a non-exclusive inclusion, so that a process, method, system, product, or device that includes a series of units is not necessarily limited to those units, but may include other units not expressly listed or inherent to such a process, method, system, product, or device.

An object reconstruction method provided in this disclosure is applicable to an object reconstruction application scenario. In an object reconstruction process, a user first scans a target object by using a camera on a terminal device, to obtain omnidirectional image data (for example, a plurality of target images in embodiments of this disclosure) of the target object, and obtains pose information obtained when the camera captures the omnidirectional image data. Then, the terminal device transfers the omnidirectional image data and the pose information to a server on a cloud side. Further, the server performs object reconstruction based on the image data and the pose information, to generate a 3D model of the target object. The terminal device may be a mobile phone, a tablet computer (IPAD), a computer with a wireless transceiver function, a virtual reality (VR) device, an augmented reality (AR) device, a wireless device in industrial control, a wireless device in self-driving, a wireless device in remote medical, a wireless device in a smart grid, a wireless device in transportation safety, a wireless device in a smart city, a wireless device in a smart home, or the like. This is not limited in embodiments of this disclosure.

Figure 1:
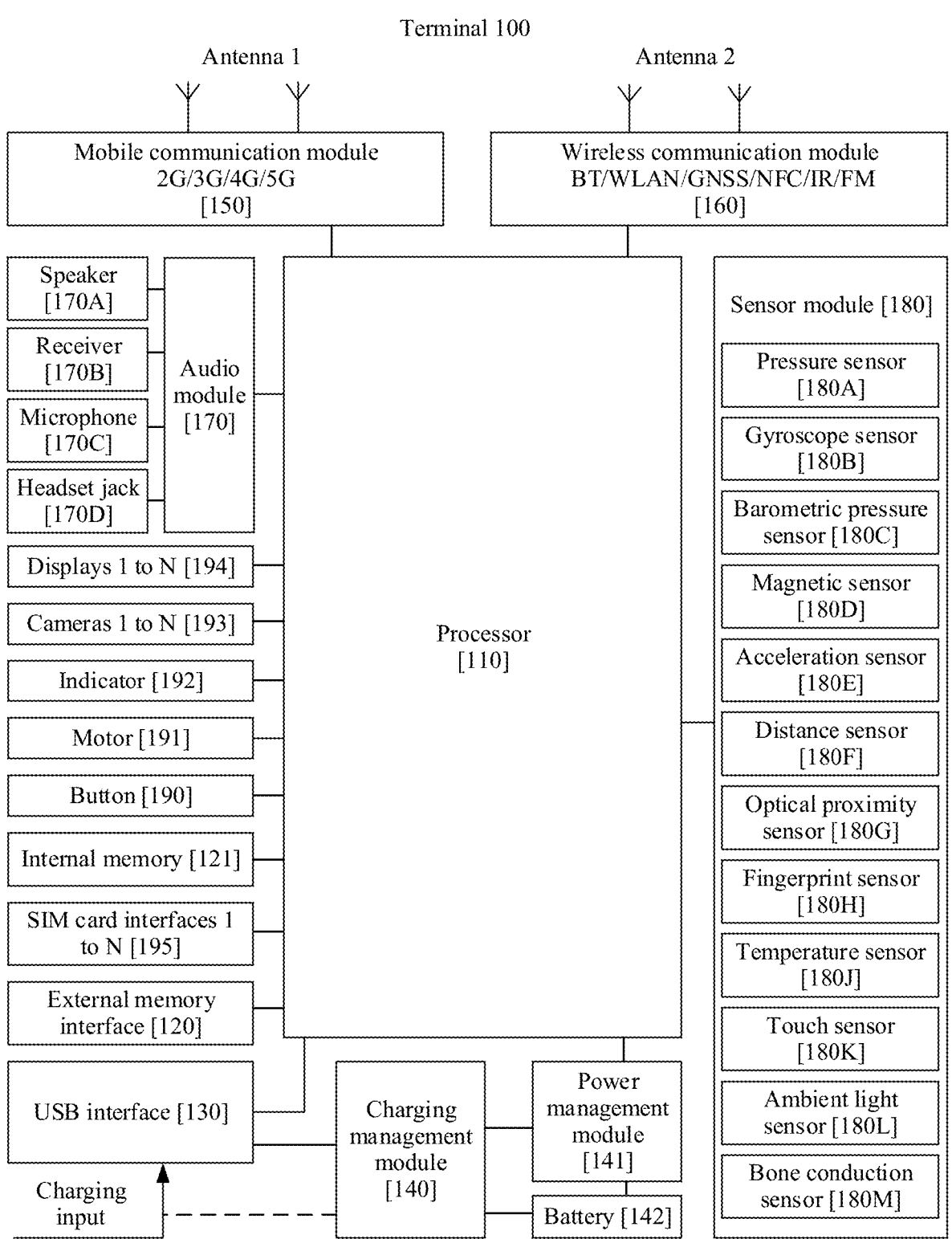
FIG. 1 is a schematic diagram of a structure of a terminal device according to an embodiment of this disclosure.

For ease of understanding, a structure of a terminal device 100 provided in an embodiment of this disclosure is described below as an example. FIG. 1 is a schematic diagram of a structure of a terminal device according to an embodiment of this disclosure.

As shown in FIG. 1, the terminal device 100 may include a processor 110, an external memory interface 120, an internal memory 121, a Universal Serial Bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present disclosure does not constitute a specific limitation on the terminal device 100. In some other embodiments of this disclosure, the terminal device 100 may include more or fewer components than those shown in the figure, or some components may be combined, or some components may be split, or different component arrangements may be used. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent components, or may be integrated into one or more processors.

The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces waiting time of the processor 110, to improve system efficiency.

In some embodiments, the processor 110 may include one or more interfaces. The interface may include an Inter-Integrated Circuit (I2C) interface, an I2C Sound (I2S) interface, a pulse-code modulation (PCM) interface, a universal asynchronous receiver/transmitter (UART) interface, a mobile industry processor interface (MIPI), a general-purpose input/output (GPIO) interface, a SIM interface, a USB interface, and/or the like.

The I2C interface is a bidirectional synchronous serial bus, including a serial data line (SDL) and a serial clock line (SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the terminal device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communication module 160 through the I2S interface, to implement a function of answering a call through a Bluetooth headset.

The PCM interface may also be used for audio communication, sampling, quantizing, and encoding an analog signal. In some embodiments, the audio module 170 may be coupled to the wireless communication module 160 through a PCM interface. In some embodiments, the audio module 170 may alternatively transfer an audio signal to the wireless communication module 160 through the PCM interface, to implement a function of answering a call through a Bluetooth headset. Both the I2S interface and the PCM interface may be used for audio communication.

The UART interface is a universal serial data bus, and is used for asynchronous communication. The bus may be a bidirectional communication bus. The bus converts to-be-transmitted data between serial communication and parallel communication. In some embodiments, the UART interface is usually used to connect the processor 110 and the wireless communication module 160. For example, the processor 110 communicates with a Bluetooth module in the wireless communication module 160 through the UART interface, to implement a Bluetooth function. In some embodiments, the audio module 170 may transfer an audio signal to the wireless communication module 160 through the UART interface, to implement a function of playing music through a Bluetooth headset.

The MIPI interface may be configured to connect the processor 110 to peripheral devices such as the display 194 and the camera 193. The MIPI interface includes a camera serial interface (CSI), a display serial interface (DSI), and the like. In some embodiments, the processor 110 communicates with the camera 193 through the CSI interface, to implement a photographing function of the terminal device 100. The processor 110 communicates with the display 194 through the DSI interface, to implement a display function of the terminal device 100.

The GPIO interface may be configured by using software. The GPIO interface may be configured as a control signal or a data signal. In some embodiments, the GPIO interface may be configured to connect the processor 110 to the camera 193, the display 194, the wireless communication module 160, the audio module 170, the sensor module 180, and the like. The GPIO interface may alternatively be configured as an I2C interface, an I2S interface, a UART interface, an MIPI interface, or the like.

Further, a video (including a plurality of target images) captured by the camera 193 may be transferred to the processor 110 through, but is not limited to, the foregoing interface (for example, the CSI interface or the GPIO interface) that is configured to connect the camera 193 and the processor 110.

The processor 110 may transfer processed images to the display 194 through, but is not limited to, the foregoing interface (for example, the DSI interface or the GPIO interface) that is configured to connect the display 194 and the processor 110, so that the display 194 can display the video.

The USB interface 130 is an interface that conforms to a USB standard specification, and may be a mini USB interface, a micro USB interface, a USB type-C interface, or the like. The USB interface 130 may be configured to connect to a charger to charge the terminal device 100, or may be configured to perform data transmission between the terminal device 100 and a peripheral device, or may be configured to connect to a headset for playing an audio through the headset. The interface may be further configured to connect to other electronic devices such as an AR device.

It may be understood that an interface connection relationship between the modules shown in this embodiment of the present disclosure is merely used as an example for description, and does not constitute a limitation on the structure of the terminal device 100. In some other embodiments of this disclosure, the terminal device 100 may alternatively use an interface connection manner different from that in the foregoing embodiment, or a combination of a plurality of interface connection manners.

The charging management module 140 is configured to receive a charging input from a charger. The charger may be a wireless charger or a wired charger. In some embodiments of wired charging, the charging management module 140 may receive a charging input of the wired charger through the USB interface 130. In some embodiments of wireless charging, the charging management module 140 may receive a wireless charging input through a wireless charging coil of the terminal device 100. When charging the battery 142, the charging management module 140 may further supply power to an electronic device by using the power management module 141.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the terminal device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the terminal device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution, applied to the terminal device 100, to wireless communication including second generation (2G), third generation (3G), fourth generation (4G), fifth generation (5G), and the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert an amplified signal into an electromagnetic wave for radiation through the antenna 1. In some embodiments, at least some functional modules in the mobile communication module 150 may be disposed in the processor 110. In some embodiments, at least some functional modules in the mobile communication module 150 and at least some modules in the processor 110 may be disposed in a same device.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in the same device as the mobile communication module 150 or another functional module.

The wireless communication module 160 may provide a solution, applied to the terminal device 100, to wireless communication including a wireless local area network (WLAN) (for example, a WI-FI network), BLUETOOTH (BT), a global navigation satellite system (GNSS), frequency modulation (FM), a near-field communication (NFC) technology, an infrared (IR) technology, or the like. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, in the terminal device 100, the antenna 1 is coupled to the mobile communication module 150, and the antenna 2 is coupled to the wireless communication module 160, so that the terminal device 100 can communicate with a network and another device by using a wireless communication technology. The wireless communication technology may include a Global System for Mobile Communications (GSM), a General Packet Radio Service (GPRS), code-division multiple access (CDMA), wideband CDMA (WCDMA), time-division CDMA (TD-SCDMA), Long-Term Evolution (LTE), BT, a GNSS, a WLAN, NFC, FM, an IR technology, and/or the like. The GNSS may include a Global Positioning System (GPS), a GNSS, a BEIDOU navigation satellite system (BDS), a Quasi-Zenith satellite system (QZSS), and/or a satellite based augmentation system (SBAS)

The terminal device 100 implements a display function through the GPU, the display 194, the application processor, and the like. The GPU is a microprocessor for image processing, and is connected to the display 194 and the application processor. The GPU is configured to perform mathematical and geometric computation for graphic rendering. The processor 110 may include one or more GPUs that execute program instructions to generate or change display information. Further, the one or more GPUs in the processor 110 may implement an image rendering task.

The display 194 is configured to display an image, a video, and the like. The display 194 includes a display panel. The display panel may be a liquid-crystal display (LCD), an organic light-emitting diode (LED) (OLED), an active-matrix OLED (AMOLED), a flexible LED (FLED), a mini-LED, a micro-LED, a micro-OLED, a quantum dot LED (QLED), or the like. In some embodiments, the terminal device 100 may include one or N displays 194, where N is a positive integer greater than 1. The display 194 may display a target video in embodiments of this disclosure. In an implementation, the terminal device 100 may run an application related to photographing. When the terminal device opens the application related to photographing, the display 194 may display a photographing interface. The photographing interface may include a viewfinder frame, and the target video may be displayed in the viewfinder frame.

The terminal device 100 may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format like RGB or luma, blue projection, and red projection (YUV). In some embodiments, the terminal device 100 may include one or N cameras 193, where N is a positive integer greater than 1.

The digital signal processor is configured to process a digital signal, and may process another digital signal in addition to the digital image signal. For example, when the terminal device 100 selects a frequency, the digital signal processor is configured to perform Fourier transform on frequency energy.

The video codec is configured to compress or decompress a digital video. The terminal device 100 may support one or more video codecs. In this way, the terminal device 100 may play or record videos in a plurality of coding formats, for example, Moving Picture Experts Group (MPEG)-1, MPEG-2, MPEG-3, and MPEG-4.

The NPU is a neural-network (NN) computing processor. The NPU quickly processes input information by referring to a structure of a biological neural network, for example, by referring to a mode of transfer between human brain neurons, and may further continuously perform self-learning. Applications such as intelligent cognition of the terminal device 100, for example, image recognition, face recognition, speech recognition, and text understanding, may be implemented through the NPU.

The external memory interface 120 may be configured to connect to an external memory card, for example, a micro Secure Digital (SD) card, to extend a storage capability of the terminal device 100. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The internal memory 121 may include a program storage area and a data storage area. The program storage area may store an operating system, an application required by at least one function (for example, a sound playing function, an image playing function, or an object reconstruction function), and the like. The data storage area may store data (for example, image data, audio data, or a phone book) and the like that are created during use of the terminal device 100. In addition, the internal memory 121 may include a high-speed random-access memory (RAM), and may further include a nonvolatile memory, for example, at least one magnetic disk storage device, a flash memory, or a universal flash storage (UFS).

The processor 110 runs instructions stored in the internal memory 121 and/or instructions stored in the memory disposed in the processor, to execute various functional applications and data processing of the terminal device 100.

The terminal device 100 may implement an audio function such as music playing or recording through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The terminal device 100 may be used to listen to music or answer a call in a hands-free mode over the speaker 170A.

The receiver 170B, also referred to as an "earpiece", is configured to convert an audio electrical signal into a sound signal. When a call is answered or voice information is received by using the terminal device 100, the receiver 170B may be put close to a human ear to listen to a voice.

The microphone 170C, also referred to as a "mike" or a "mic", is configured to convert a sound signal into an electrical signal. When making a call or sending voice information, a user may make a sound near the microphone 170C through the mouth of the user, to input a sound signal to the microphone 170C. At least one microphone 170C may be disposed in the terminal device 100. In some other embodiments, two microphones 170C may be disposed in the terminal device 100, to collect a sound signal and implement a noise reduction function. In some other embodiments, three, four, or more microphones 170C may alternatively be disposed in the terminal device 100, to collect a sound signal, implement noise reduction, identify a sound source, implement a directional recording function, and the like.

The headset jack 170D is configured to connect to a wired headset. The headset jack 170D may be the USB interface 130, or may be a 3.5 millimeter (mm) Open Mobile Terminal Platform (OMTP) standard interface or a cellular telecommunications industry association (CTIA) standard interface.

The pressure sensor 180A is configured to sense a pressure signal, and may convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The terminal device 100 determines an intensity of pressure based on a capacitance change. When a touch operation is performed on the display 194, the terminal device 100 detects an intensity of the touch operation through the pressure sensor 180A. The terminal device 100 may also calculate a touch location based on a detection signal of the pressure sensor 180A. In some embodiments, touch operations that are performed at a same touch location but have different touch operation intensities may correspond to different operation instructions. For example, when a touch operation whose touch operation intensity is less than a first pressure threshold is performed on a messaging application icon, an instruction for viewing a Short Message/Messaging Service (SMS) message is executed. When a touch operation whose touch operation intensity is greater than or equal to a first pressure threshold is performed on a messaging application icon, an instruction for creating a new SMS message is executed.

The gyroscope sensor 180B may be configured to determine a motion posture of the terminal device 100. In some embodiments, angular velocities of the terminal device 100 around three axes (namely, x, y, and z axes) may be determined by using the gyroscope sensor 180B. The gyroscope sensor 180B may alternatively be used in a navigation scenario and a somatic game scenario.

The barometric pressure sensor 180C is configured to measure barometric pressure. In some embodiments, the terminal device 100 calculates an altitude based on a barometric pressure value measured by the barometric pressure sensor 180C, to assist in positioning and navigation.

The magnetic sensor 180D includes a Hall sensor. The terminal device 100 may detect opening and closing of a flip leather case by using the magnetic sensor 180D. In some embodiments, when the terminal device 100 is a clamshell phone, the terminal device 100 may detect opening and closing of a flip cover based on the magnetic sensor 180D. Further, a feature like automatic unlocking of the flip cover is set based on a detected open or closed state of the leather case or the flip cover.

The acceleration sensor 180E may detect accelerations in various directions (usually on three axes) of the terminal device 100. When the terminal device 100 is still, a magnitude and a direction of gravity may be detected. The acceleration sensor 180E may be further configured to identify a posture of the electronic device, and is used in applications like switching between a landscape mode and a portrait mode, a pedometer, and the like.

The distance sensor 180F is configured to measure a distance. The terminal device 100 may measure the distance in an infrared manner or a laser manner. In some embodiments, in a photographing scenario, the terminal device 100 may measure a distance through the distance sensor 180F to implement quick focusing.

The optical proximity sensor 180G may include, for example, an LED, and an optical detector like a photodiode. The LED may be an infrared LED. The terminal device 100 emits infrared light by using the LED. The terminal device 100 detects infrared reflected light from a nearby object by using the photodiode. When sufficient reflected light is detected, the terminal device 100 may determine that there is an object near the terminal device 100. When insufficient reflected light is detected, the terminal device 100 may determine that there is no object near the terminal device 100. The terminal device 100 may detect, by using the optical proximity sensor 180G, that the user holds the terminal device 100 close to an ear for a call, to automatically turn off the display for power saving. The optical proximity sensor 180G may also be used in a smart cover mode or a pocket mode to automatically perform screen unlocking or locking.

The ambient light sensor 180L is configured to sense ambient light brightness. The terminal device 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the terminal device 100 is in a pocket, to avoid an accidental touch.

The fingerprint sensor 180H is configured to collect a fingerprint. The terminal device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal device 100 executes a temperature processing policy by using the temperature detected by the temperature sensor 180J. For example, when the temperature reported by the temperature sensor 180J exceeds a threshold, the terminal device 100 lowers performance of a processor located near the temperature sensor 180J, to reduce power consumption for thermal protection. In some other embodiments, when the temperature is less than another threshold, the terminal device 100 heats the battery 142, to prevent the terminal device 100 from being shut down abnormally due to a low temperature. In some other embodiments, when the temperature is less than still another threshold, the terminal device 100 boosts an output voltage of the battery 142, to avoid abnormal shutdown caused by a low temperature.

The touch sensor 180K is also referred to as a "touch device". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor to determine a type of a touch event. The display 194 may provide a visual output related to the touch operation. In some other embodiments, the touch sensor 180K may alternatively be disposed on a surface of the terminal device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse, to receive a blood pressure beating signal. In some embodiments, the bone conduction sensor 180M may alternatively be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The terminal device 100 may receive a button input, and generate a button signal input related to a user setting and function control of the terminal device 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the terminal device 100. The terminal device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or different types. The SIM card interface 195 is also compatible with different types of SIM cards. The SIM card interface 195 is also compatible with an external memory card. The terminal device 100 interacts with a network by using the SIM card, to implement functions such as call and data communication. In some embodiments, the terminal device 100 uses an eSIM, namely, an embedded SIM card. The eSIM card may be embedded in the terminal device 100, and cannot be separated from the terminal device 100.

A software system of the terminal device 100 may use a layered architecture, an event-driven architecture, a micro-kernel architecture, a microservice architecture, or a cloud architecture. In this embodiment of the present disclosure, a software structure of the terminal device 100 is described by using an ANDROID system with the layered architecture as an example.

Figure 2:
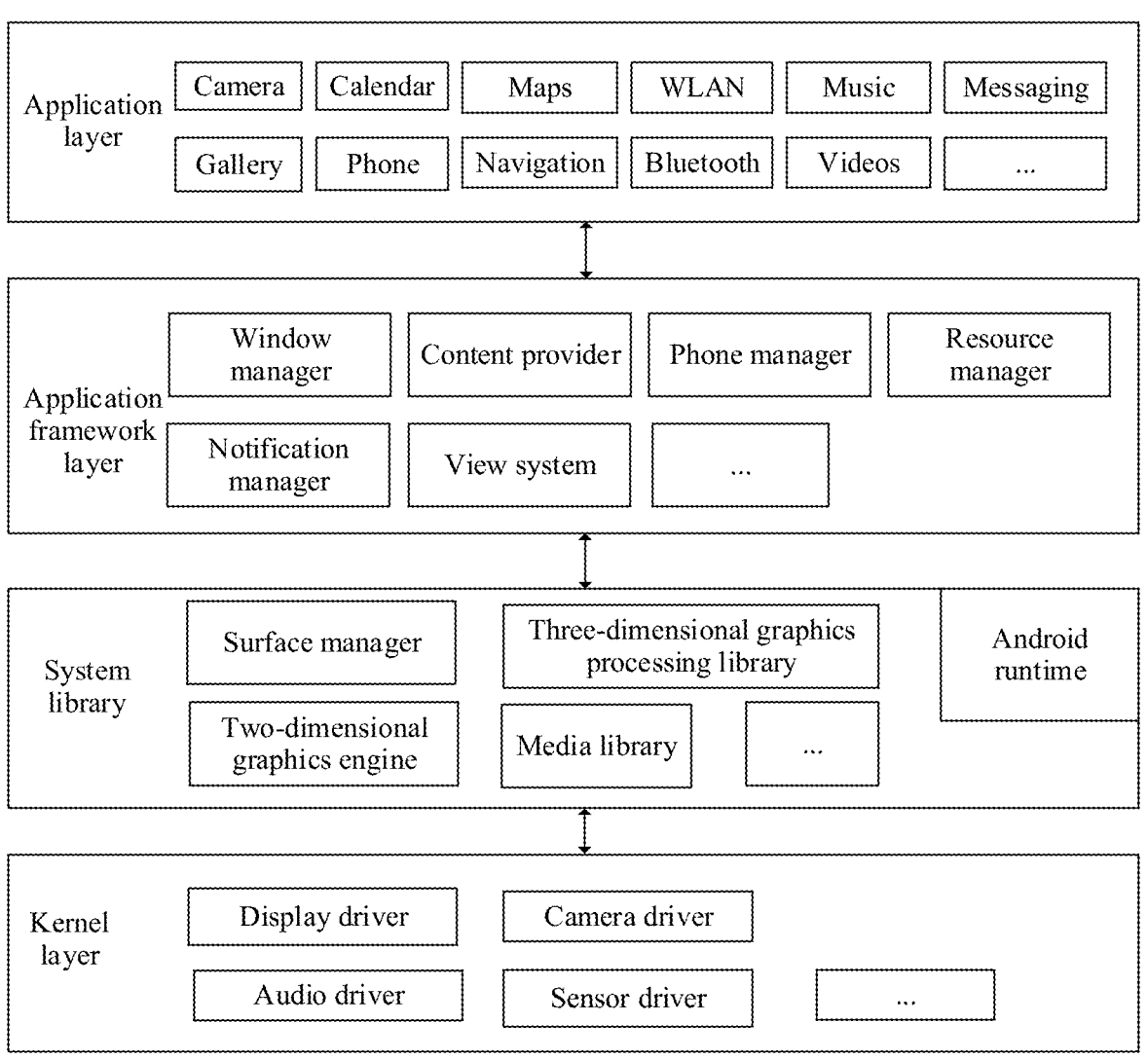
FIG. 2 is a block diagram of a software structure of a terminal device according to an embodiment of this disclosure.

FIG. 2 is a block diagram of the software structure of the terminal device 100 according to an embodiment of the present disclosure.

In the layered architecture, software is divided into several layers, and each layer has a clear role and task. The layers communicate with each other through a software interface. In some embodiments, the ANDROID system is divided into four layers: an application layer, an application framework layer, an ANDROID runtime and system library, and a kernel layer from top to bottom.

The application layer may include a series of application packages.

As shown in FIG. 2, the application packages may include applications such as Camera, Gallery, Calendar, Phone, Maps, Navigation, WLAN, BLUETOOTH, Music, Videos, and Messaging.

The application framework layer provides an application programming interface (API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to store and obtain data, and enable the data to be accessed by an application. The data may include a video, an image, an audio, calls that are made and answered, a browsing history and bookmarks, an address book, and the like.

The view system includes visual controls such as a control for displaying a text and a control for displaying a picture. The view system may be configured to build an application. A display interface may include one or more views. For example, a display interface including an SMS message notification icon may include a view for displaying a text and a view for displaying a picture.

The phone manager is configured to provide a communication function of the terminal device 100, for example, management of a call status (including answering, declining, or the like).

The resource manager provides, for an application, various resources such as a localized character string, an icon, a picture, a layout file, and a video file.

The notification manager enables an application to display notification information in a status bar, and may be configured to convey a notification message. The notification message may automatically disappear after a short pause without user interaction. For example, the notification manager is configured to notify download completion, give a message notification, and the like. The notification manager may alternatively be a notification that appears in a top status bar of the system in a form of a graph or a scroll bar text, for example, a notification of an application running on a background, or may be a notification that appears on a screen in a form of a dialog window. For example, text information is displayed in the status bar, a prompt tone is given, the electronic device vibrates, or the indicator light blinks.

The ANDROID runtime includes a kernel library and a virtual machine. The ANDROID runtime is responsible for scheduling and management of the ANDROID system.

The kernel library includes two parts: a function that needs to be invoked in JAVA language and a kernel library of ANDROID.

The application layer and the application framework layer run on the virtual machine. The virtual machine executes JAVA files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a 3D graphics processing library (for example, OpenGL Embedded System (ES)), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of types of audio and video coding formats such as MPEG-4, H.264, MPEG-1 Audio Layer III or MPEG-2 Audio Layer III (MP3), Advanced Audio Coding (AAC), Adaptive Multi-Rate (AMR), Joint Photographic Experts Group (JPEG), and Portable Network Graphics (PNG).

The 3D graphics processing library is configured to implement 3D graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working procedure of software and hardware of the terminal device 100 with reference to a photographing scenario.

When the touch sensor 180K receives a touch operation, a corresponding hardware interrupt is sent to the kernel layer. The kernel layer processes the touch operation into an original input event (including touch coordinates, a timestamp of the touch operation, and other information). The original input event is stored at the kernel layer. The application framework layer obtains the original input event from the kernel layer, and identifies a control corresponding to the input event. For example, the touch operation is a single-tap touch operation, and a control corresponding to the single-tap operation is a control of a camera application icon. A camera application invokes an interface at an application framework layer, so that the camera application is started. Then, a camera driver is started by invoking a kernel layer, and a static image or a video is captured by using camera 193. The captured video may be the plurality of target images in embodiments of this disclosure.

Figure 3:
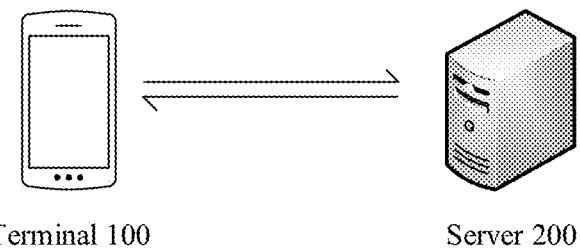
FIG. 3 is a schematic diagram of an application architecture according to an embodiment of this disclosure.

FIG. 3 is a schematic diagram of an application scenario according to an embodiment of this disclosure. As shown in FIG. 3, this embodiment of this disclosure is further applied to a system for interaction between a terminal device and a server. As shown in FIG. 3, the system may include a terminal device 100 and a server 200.

Figure 4:
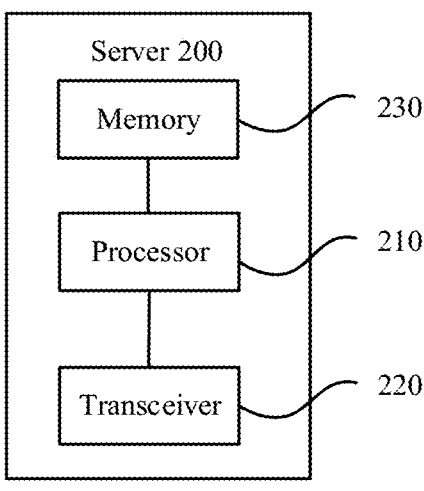
FIG. 4 is a schematic diagram of an architecture of a server according to an embodiment of this disclosure.

As shown in FIG. 4, the server 200 may include a processor 210 and a transceiver 220. The transceiver 220 may be connected to the processor 210. The transceiver 220 may include a receiver and a transmitter, and may be configured to receive or send a message or data. The transceiver 220 may be a network adapter. The server 200 may further include an acceleration component (which may be referred to as an accelerator). When the acceleration component is a network acceleration component, the acceleration component may be a network adapter. The processor 210 may be a control center of the server 200, and is connected to various parts, such as the transceiver 220, of the entire server 200 through various interfaces and lines. In the present disclosure, the processor 210 may be a central processing unit (CPU). Optionally, the processor 210 may include one or more processing units. The processor 210 may alternatively be a digital signal processor, an application-specific integrated circuit (ASIC), a field-programmable gate array (FPGA), a GPU, another programmable logic device, or the like. The server 200 may further include a memory 230. The memory 230 may be configured to store a software program and a module. The processor 210 reads software code and the module that are stored in the memory 230, to execute various functional applications and data processing of the server 200.

For ease of understanding, an object reconstruction method provided in embodiments of this disclosure is described in detail with reference to the accompanying drawings and the application scenario.

FIG. 5 is a flowchart of an embodiment of an object reconstruction method according to this disclosure. As shown in FIG. 5, the method in this embodiment may be performed by the terminal device (for example, the terminal 100) in the foregoing embodiment. The object reconstruction method may include the following steps.

Step 501: Obtain a first image captured by the terminal device for a target object.

A user starts a camera of the terminal device, and places the target object within a photographing range of the camera. In this disclosure, the user is not limited to a person, and may alternatively be any creature or device that operates the terminal device. In a process of obtaining an image of the target object by using the camera, the target object is fixedly placed at a location, and the user moves the terminal device to photograph the target object from different angles, to obtain a plurality of images. The plurality of target images record appearances of the target object that are captured by the terminal device at various angles. Alternatively, in a process of obtaining an image of the target object by using the camera, the user continuously flips the target object. At the same time, the camera captures an image of the target object, to obtain a plurality of images. The plurality of images record appearances of the target object at various angles in a process of flipping the target object.

The plurality of images may include a color map and a time of flight (ToF) depth map. The depth map is optional. The color map is used to represent reflected light information that is of an object and that is obtained by the camera, and the reflected light information includes information such as a form, a texture, and a reflected light feature of the object. The ToF depth map is used to represent a distance between the terminal device and the object, which is usually referred to as a depth. The distance is a product of a speed of the infrared ray and a time that elapses between emission of an infrared ray from a built-in infrared emission apparatus of the terminal device and arrival of the infrared ray reflected by the object at an infrared receiving apparatus.

502: Display first guidance information based on a location of the target object in the first image and a real pose corresponding to a case in which the terminal device captures the first image, where the first guidance information indicates a plurality of capture viewpoints, and the plurality of capture viewpoints are distributed around the target object.

503: Obtain a plurality of target images captured by controlling, by a user based on the first guidance information, a pose of the terminal device, where each target image is captured from one of the capture viewpoints.

In a possible implementation, because the terminal device captures a large quantity of images for the target object, if the terminal device sends the large quantity of captured images to a server on a cloud side, a large amount of data is transmitted, and an advantage of terminal-cloud combination is not fully utilized. Therefore, in this embodiment of this disclosure, some images (for example, the plurality of target images in this embodiment of this disclosure, which are also referred to as a plurality of keyframes) may be selected from the plurality of images, and the some selected images are transferred to the server on the cloud side (for example, keyframe selection 102 shown in FIG. 10).

A manner of selecting the plurality of target images from the plurality of images is described below.

In a possible implementation, to ensure integrity of a subsequently reconstructed target object, the plurality of selected target images need to cover all local areas of the target object. To be specific, the plurality of selected target images need to meet a condition that angle-of-view coverage for the target object is greater than a threshold. The threshold may be a ratio of a size of an angle-of-view coverage area of the target object to a size of a surface area of the target object. For example, the threshold may be, but is not limited to, 95%, 96%, 99%, or 100%. It should be understood that, in some scenarios, only a part of an area on the target object is visible due to existence of an obstacle (for example, a ground). In this case, the threshold is a ratio of the size of the angle-of-view coverage area of the target object to a size of a visible surface area of the target object.

In a possible implementation, in the plurality of images captured by the camera, there is a large degree of angle-of-view overlap between a large quantity of images for the target object. To reduce a quantity of selected images, an image frame is selected from the images between which there is a large degree of angle-of-view overlap. For example, the image frame may be extracted from an original image sequence based on spatial location distribution of image frames (for example, when a frame spacing between a current image and a previous frame of key image is greater than a specific distance, the current image is selected as the target image), or the image frame may be extracted from an original image sequence based on a time interval (for example, for an image sequence of 30 frames per second, a frame is selected as the target image at an interval of 15 frames (namely, 0.5 second)).

In a possible implementation, the first guidance information (for example, capture guidance 103 shown in FIG. 10) may be displayed on a photographing interface to guide the user to capture the target images whose angle-of-view coverage for the target object is greater than a threshold, and whose degrees of angle-of-view overlap between different capture viewpoints are less than a threshold. The first guidance information indicates the plurality of capture viewpoints, and the plurality of capture viewpoints are distributed around the target object. The plurality of capture viewpoints may meet at least one of the following conditions. Angle-of-view coverage of the plurality of capture viewpoints for the target object is greater than a threshold, and a degree of angle-of-view overlap between different capture viewpoints in the plurality of capture viewpoints is less than a threshold, for example, may be less than 95%, 96%, 90%, or the like, and the degree of angle-of-view overlap between different capture viewpoints in the plurality of capture viewpoints is greater than a threshold, for example, may be greater than 75%, 76%, 70%, or the like. Further, target images photographed by the user from the foregoing capture viewpoints also accordingly meet a condition that an angle-of-view coverage for the target object is greater than a threshold, and/or a condition that a degree of angle-of-view overlap between different target images is less than a threshold.

A manner of determining the plurality of capture viewpoints and displaying the first guidance information is described below.

Figure 6:
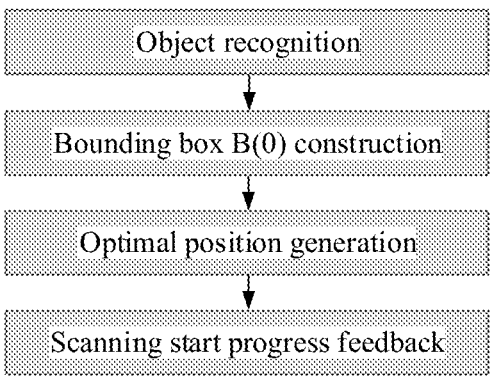
FIG. 6 is a schematic diagram of an embodiment of an object reconstruction method according to an embodiment of this disclosure.
Figure 10:
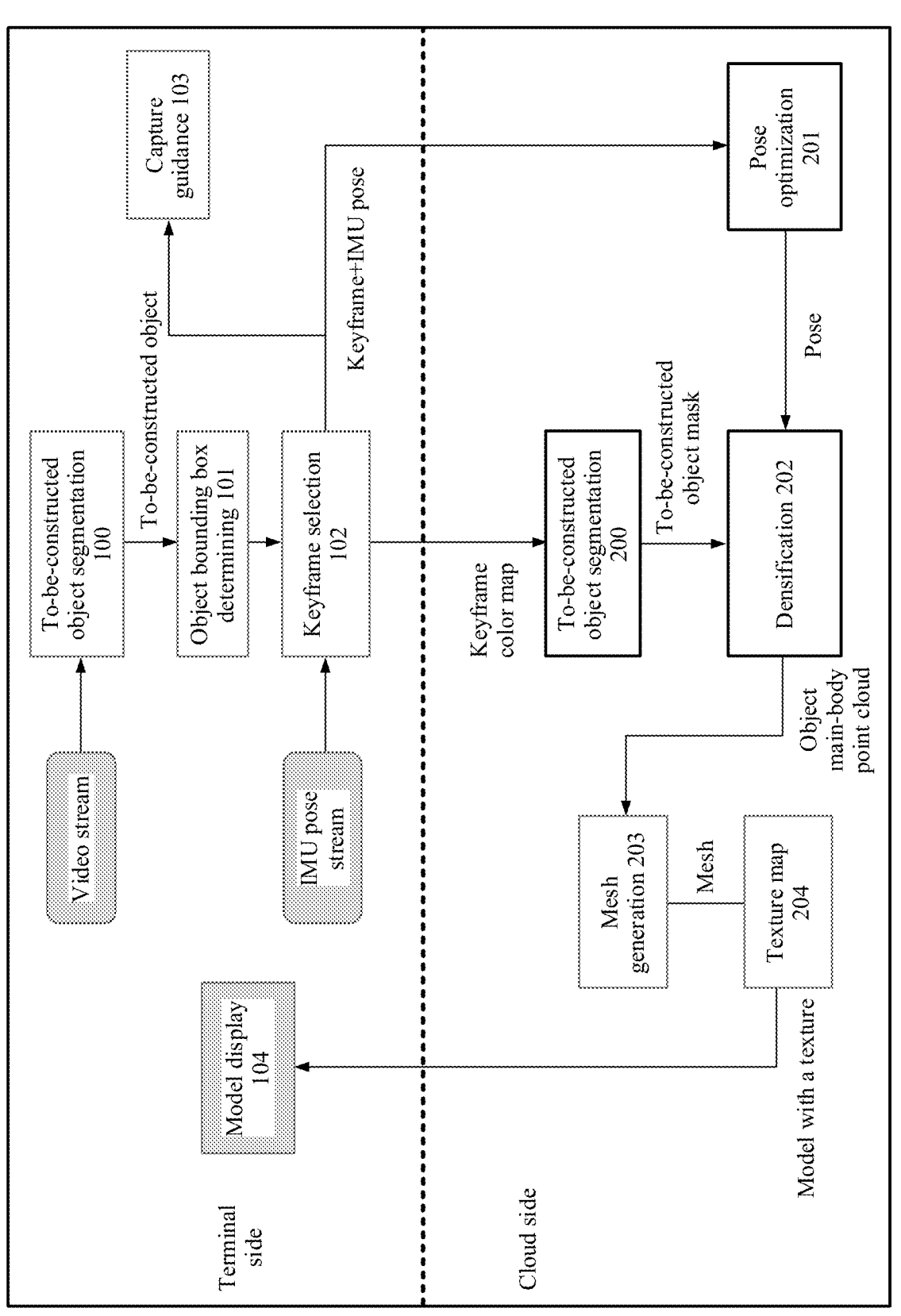
FIG. 10 is a schematic diagram of an embodiment of an object reconstruction method according to an embodiment of this disclosure.

As shown in FIG. 6, when the camera starts to capture an image (for example, captures a $0^{th}$ frame), a bounding box B(0) of a to-be-constructed object may be constructed by using segmentation-based 2D object recognition, and recommended optimal positions (the plurality of capture viewpoints) are generated based on a requirement (for example, common-view area overlap is more than 70%) of a reconstruction algorithm on a multi-view image overlap degree. When the bounding box B(0) is generated, a plane in the ToF depth map may be detected by using an agglomerative hierarchical clustering (AHC) algorithm and based on the ToF depth map. All planes P1, P2, . . . , and Pn in the ToF depth map may be detected by using the AHC algorithm. A plane with a largest quantity of pixels is extracted as a main plane P based on a quantity of pixels occupied by each plane. The terminal device projects the pixels of the main plane onto 3D space, to generate a bounding box in the 3D space. The main plane is used as a bottom surface of the bounding box, and a height of the bounding box is H (which is preset) (for example, to-be-constructed object segmentation 100 and object bounding box determining 101 that are shown in FIG. 10).

Figure 7:
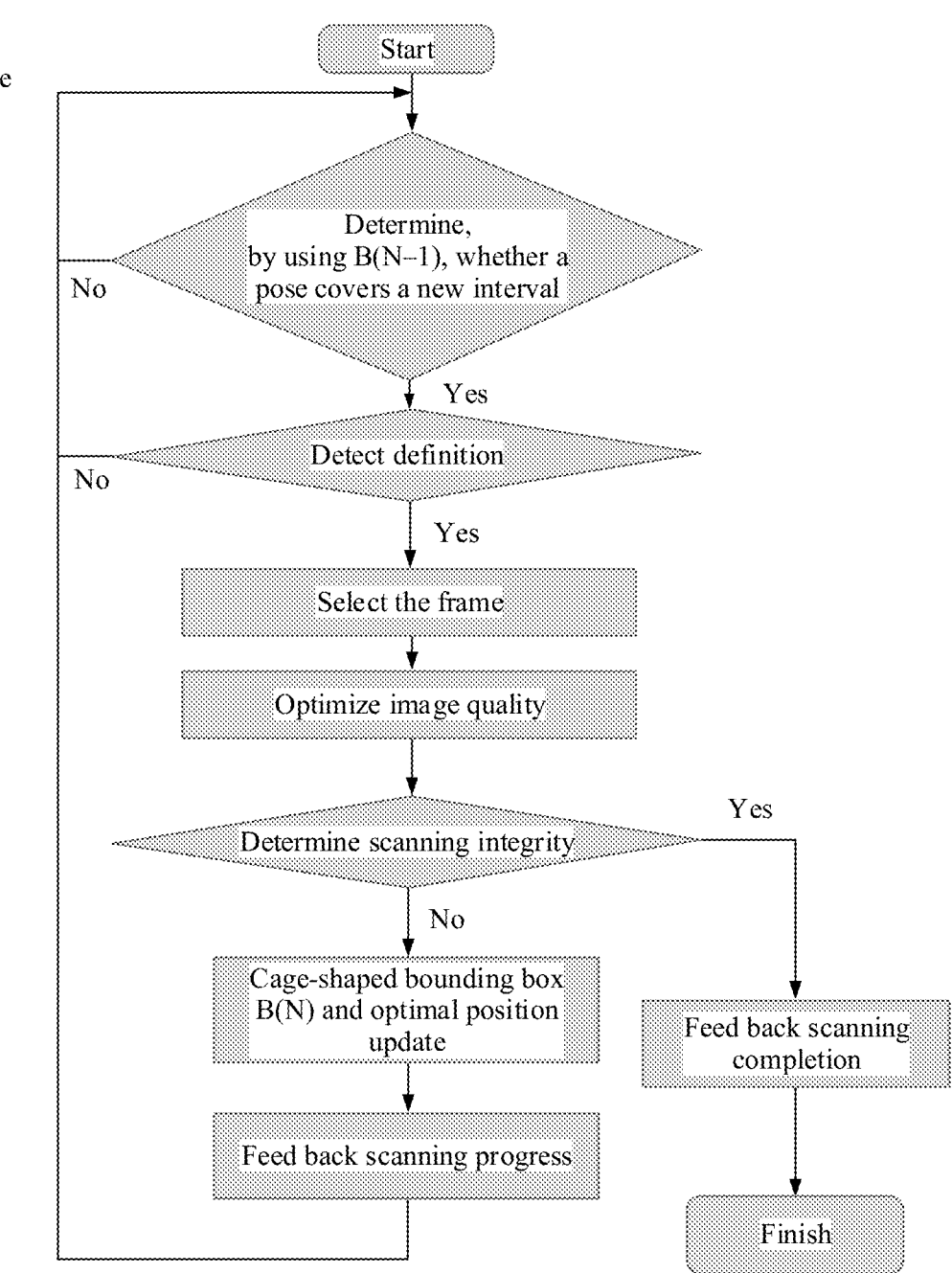
FIG. 7 is a schematic diagram of an embodiment of an object reconstruction method according to an embodiment of this disclosure.

As shown in FIG. 7, in a process in which the camera captures an image in real time, for example, for an $N^{th}$ frame, whether a pose of a new frame covers a new interval may be determined by using a previous round B(N–1). If the pose of the new frame covers the new interval, definition of the frame is determined. If the definition meets a requirement, the frame is selected to light up a new position and optimize image quality (for example, image quality may be optimized by using an image enhancement algorithm like high-dynamic range (HDR) rendering or deblurring). Alternatively, if the pose of the new frame does not cover the new interval, the frame is directly discarded. After a new frame is selected, the terminal device determines scanning integrity (for example, determines position coverage) and feeds back scanning progress. Feedback information of the scanning progress may be displayed on a user interface (UI), and may be an obtained feature point, angle-of-view coverage position information, and the like.

As described above, while scanning the target object, the terminal device obtains a pose in real time. In a process of obtaining the images of the target object by using the camera, as the user flips the target object at more angles, poses accumulated through scanning are closer to a scanning objective. Integrity of the target object scanned by the terminal device may be prompted by using a number, a progress bar, a 3D model, or the like. When the integrity of the target object scanned by the terminal device reaches 100%, the terminal device may display related words on a screen to prompt the user to end scanning. Alternatively, the terminal device may directly end scanning. In this way, the scanning progress is prompted through a display interface, so that the user can determine a next flip angle for the target object. In addition, the user can be explicitly prompted that scanning ends, to avoid an unnecessary operation.

In this embodiment of this disclosure, a sensor like an IMU configured to capture pose information of the terminal device may be further deployed on the terminal device. When the camera captures each frame of target image, the terminal device may obtain, in real time, a pose corresponding to each target image. The pose may indicate a real pose corresponding to a case in which the camera captures a corresponding target image. The term "pose" includes a location and a posture. If the camera moves in a plane, a location of the camera may be described by using 2D coordinates, and a posture of the camera may be described by using a rotation angle θ. If the camera moves in 3D space, a location of the camera may be described by using 3D coordinates, and a posture of the camera may be described in a plurality of manners. Common manners are, for example, Euler angles, a quaternion, and a rotation matrix.

504: Send, to a server, the plurality of target images and a first pose corresponding to each target image, where the first pose indicates a real pose corresponding to a case in which the terminal device captures a corresponding target image, the plurality of target images and the first pose corresponding to each target image are used to construct a 3D model of the target object, and the first pose is captured by the sensor on the terminal device.

In this embodiment of this disclosure, after obtaining the plurality of target images and the first pose corresponding to each target image, the terminal device may transfer, to the server, the plurality of target images and the first pose corresponding to each target image. Further, the server may construct the 3D model of the target object based on the plurality of target images and the first pose corresponding to each target image.

A manner of constructing the 3D model of the target object based on the plurality of target images and the first pose corresponding to each target image is described below.

In a possible implementation, image segmentation may be performed on the plurality of target images, to obtain an image area in which the target object is located in each target image.

The image segmentation may be performed based on visual saliency (for example, to-be-constructed object segmentation 200 shown in FIG. 10). Creatures such as a human form an attention mechanism by using saliency detection, and select a part of an obtained image area for processing, to reduce processing complexity and improve learning and survivability. Visual saliency of an object is a saliency degree of the object relative to a neighborhood background. The image segmentation performed based on the visual saliency may be implemented by using a deep learning network, and usually includes two main modules: an encoder-decoder (En-De) module and a residual refinement module (RRM). The encoder-decoder module is used to predict an initial value of a saliency segmentation map. The RRM module is used to learn a residual between the initial value of the saliency segmentation map and a ground truth, to optimize the saliency segmentation map.

In a possible implementation, a pose of each image may be determined and optimized (for example, pose optimization 201 shown in FIG. 10). To determine a point in a world coordinate system (for example, a map) to which the target object in the target image captured by the camera corresponds, a coordinate value of the target object for a camera coordinate system needs to be obtained first, and then the coordinate value is converted to the world coordinate system based on a pose of the camera. In computer vision, a pose indicates a relative relationship, and reflects a transform relationship between the target object and the camera (namely, the terminal device). A pose of an image indicates a location and a posture that are presented by a pattern of the target object in the target image obtained by capturing the target object by the camera.

In a possible implementation, operations such as feature point matching and triangulation need to be performed on images between which there is a large degree of angle-of-view overlap (or described as images between which there is a pose association relationship) in the plurality of target images, to obtain a sparse point cloud of the target object. Further, a local feature and a descriptor may be extracted from each target image, where a feature point may be SIFT, D2Net, ASlFeat, or the like. Then, feature matching and geometric verification are performed on each pair of target images.

In some scenarios, because there are a plurality of local areas on the target object, and materials and texture features of the plurality of local areas are similar, target images obtained by capturing these local areas are similar. After feature matching is performed, it may be considered that there is a pose association relationship between these target images, and specific distortion may occur on the sparse point cloud that is of the target object and that is constructed based on these target images.

Figure 8:
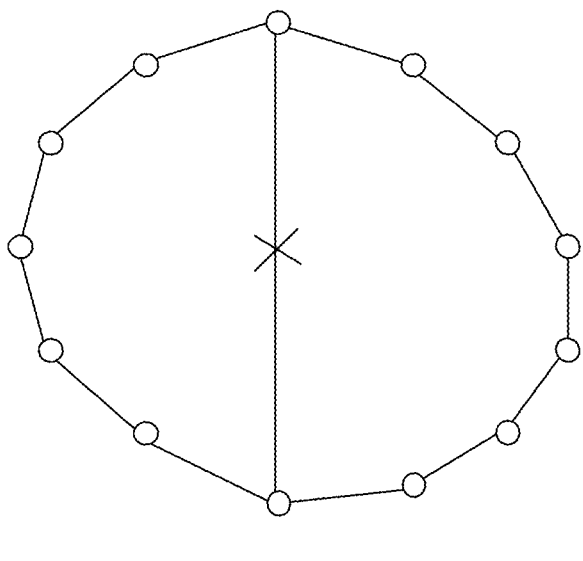
FIG. 8 is a schematic diagram of an embodiment of constructing a pose association relationship according to an embodiment of this disclosure.

In this embodiment of this disclosure, the pose association relationship between the plurality of target images may be determined based on the first pose corresponding to each target image, where a difference between real poses corresponding to a case in which the camera captures the plurality of target images between which there is the pose association relationship is less than a threshold. Because the first pose corresponding to each target image can express a real pose relationship between the images, a pose association relationship is not established between target images with similar textures when a pose difference is large. This avoids matching of non-adjacent frames. That is, an error on the pose association relationship caused by the foregoing similar textures is avoided. For example, refer to FIG. 8.

In some scenarios, there is a local area with a small quantity of textures on the target object. In this case, in establishment of a pose association relationship between the target image including the local area with a small quantity of textures and another target image, because the target image includes the local area with a small quantity of textures, the pose association relationship between the target image and the another target image may not be accurately determined, or the pose association relationship cannot be determined.

In this embodiment of this disclosure, the pose association relationship between the plurality of target images may be determined based on the first pose corresponding to each target image, where a difference between real poses corresponding to a case in which the camera captures the plurality of target images between which there is the pose association relationship is less than a threshold. Because the first pose corresponding to each target image can express a real pose relationship between the images, a pose association relationship can be established for a target image with a small pose difference, even if a local area with a small quantity of textures is included. This further increases a capability of resisting a weak texture.

It should be understood that the pose association relationship between the plurality of target images may alternatively be established by the terminal device based on the first pose corresponding to each target image and the plurality of target images. Further, the terminal device may determine the pose association relationship between the plurality of target images based on the first pose corresponding to each target image, where the difference between real poses corresponding to a case in which the camera captures the plurality of target images between which there is the pose association relationship is less than the threshold. Then, the terminal device sends the pose association relationship to the server.

Further, the server may obtain the sparse point cloud of the target object through incremental reconstruction based on the plurality of target images (or an image segmentation result) and the pose association relationship between the plurality of target images.

In a possible implementation, the incremental reconstruction may include four steps: initialization, image registration, triangulation, and bundle adjustment.

In an initialization phase, two frames of optimal images (an optimal initial pair, where there is a pose association relationship between the images) may be selected from the plurality of target images, an initial pose is calculated, and an initial point cloud is triangulated. The optimal initial pair may meet the following conditions. A quantity of inlier matches (after geometric correction is performed) is greater than a threshold t1, a forward/backward translation distance z between the two images is less than a threshold t2, and a triangulation angle is greater than a threshold t3.

In an image registration phase, according to an optimal view frame selection method, registered images between which there is the pose association relationship is sorted. Then, information about a next frame of optimal image is obtained based on the three conditions in the initialization step. The image is registered by using a Perspective-3-Points (P3p) random sample consensus algorithm, and a pose of the image is calculated.

In a triangulation processing phase, because the pose of the image is known, a corresponding 3D point may be obtained through triangulation based on a pose of a current frame, a pose of a registered frame, and a matching relationship, and then a plurality of frames are calculated, to obtain an initial sparse point cloud.

The bundle adjustment is a joint nonlinear method that optimizes a pose and a 3D map point by minimizing a re-projection error. The initial sparse point cloud and the frame that is registered in a system and that is obtained in the previous steps are input. An optimized pose (a second pose corresponding to each target image in this embodiment of this disclosure) and an optimized initial sparse point cloud are output. After the bindle adjustment is performed, to ensure precision, the initial sparse point cloud may be re-triangulated and filtered.

Because an image does not have depth information, the second pose that corresponds to each target image and that is obtained based on the feature matching between images and the bundle adjustment can accurately indicate only a relative pose in an image coordinate system. In addition, the constructed initial sparse point cloud can indicate only a shape, a contour, texture information, and the like of the target object. However, a size of the constructed initial sparse point cloud cannot be consistent with a size of the target object in real physical space. Consequently, a size distortion occurs on a reconstructed 3D model.

In this embodiment of this disclosure, the sparse point cloud of the target object may be constructed based on the plurality of target images and the first pose corresponding to each target image, and a distribution size of the sparse point cloud is consistent with a real size of the target object. Further, the initial sparse point cloud of the target object is constructed based on the plurality of target images, and the second pose corresponding to each target image is determined. A size of the initial sparse point cloud is consistent with a size obtained when the target object is photographed from a target virtual viewpoint. The second pose corresponding to each target image is a pose corresponding to a case in which the target object is captured from the virtual viewpoint. A pose adjustment relationship is determined based on the first pose corresponding to each target image and the second pose corresponding to each target image, and location distribution of the initial sparse point cloud is adjusted based on the pose adjustment relationship, to obtain the sparse point cloud of the target object. The pose adjustment relationship may be, but is not limited to, a transform matrix.

After obtaining the sparse point cloud, the server may perform 3D reconstruction on the target object based on the sparse point cloud, to obtain the 3D model of the target object.

Figure 9:
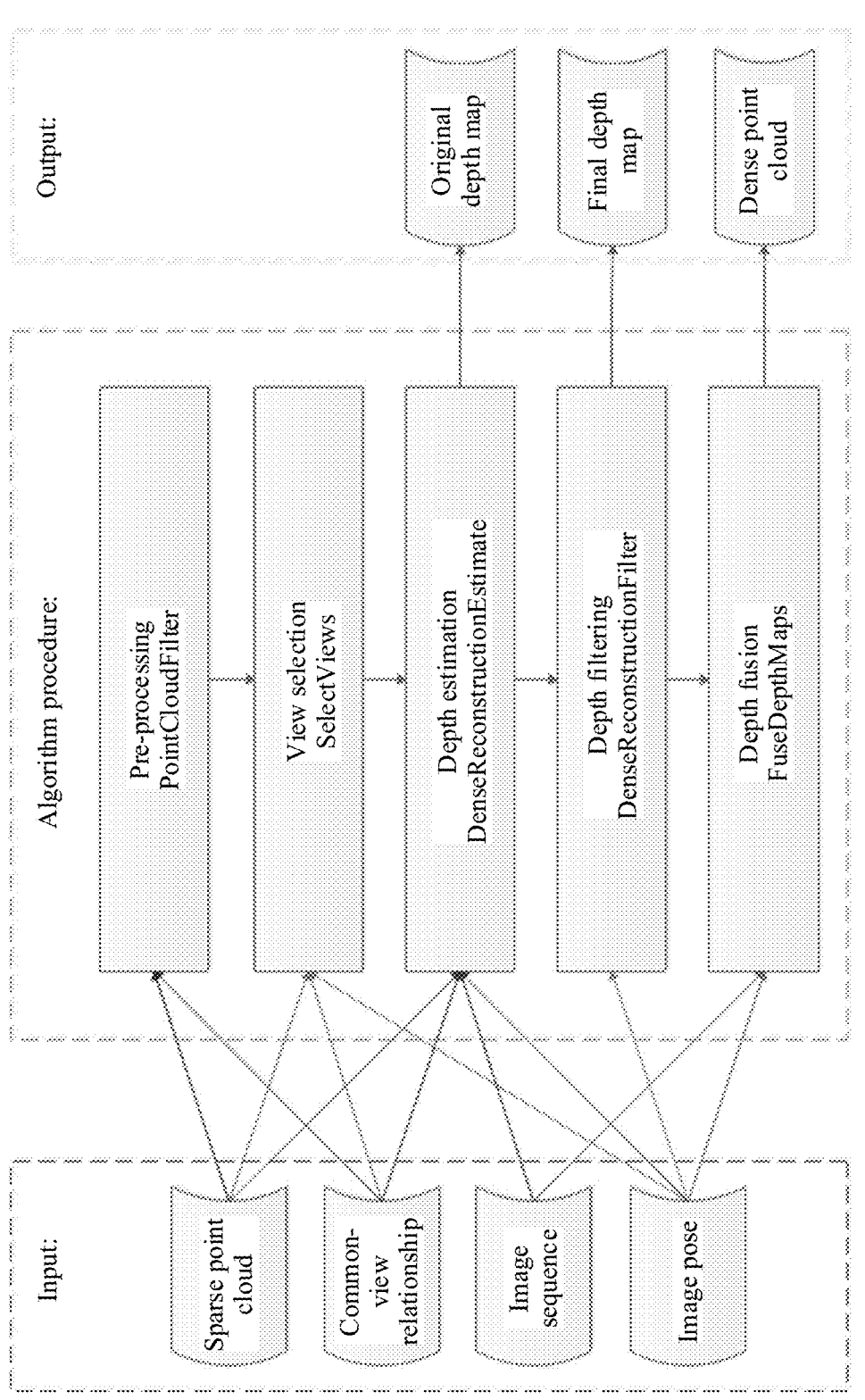
FIG. 9 is a schematic diagram of an embodiment of an object reconstruction method according to an embodiment of this disclosure.

Further, densification processing (for example, densification 202 shown in FIG. 10) may be performed on the sparse point cloud. In the densification processing, dense point cloud estimation may be completed through stereo matching of a multi-view color map. A densification processing procedure may include the following steps: preprocessing, view selection, depth estimation, depth filtering, and depth fusion. FIG. 9 is a schematic diagram of the densification processing. In the preprocessing step, depth range information may be obtained by using the sparse point cloud and common-view relationship information of the target image. In the view selection step, an associated adjacent view is selected for a current frame by using the sparse point cloud and the common-view relationship information. In the depth estimation step, a depth value is estimated for the current frame pixel by pixel by using a photometric consistency relationship between the current frame and the adjacent view, to output an original depth map. In the depth filtering step, filtering is performed on the original depth map, a low confidence depth point and an invalid depth point are removed, to output a final depth map. Finally, in the depth fusion step, the final depth map is fused into a dense point cloud by using an image pose.

Implementation of the depth estimation step may include two types, namely, implementation based on a conventional algorithm and implementation based on artificial intelligence (AI). For example, pixel-by-pixel depth value estimation may be implemented based on patch matching. Depth value estimation is usually implemented by using a cost volume in an AI-based algorithm. Common open-source algorithms include MVSNet, CasMVSNet, DPSNet, and the like.

In a mesh generation step, a mesh may be generated from the dense point cloud. Common algorithms include a Poisson algorithm, a Delaunay algorithm, an AI deformation-based Point2Mesh algorithm, and the like. A core idea of Poisson reconstruction is that a point cloud indicates a location of an object surface, and a normal vector of the point cloud indicates an inward or outward direction. Estimation of a smooth object surface is obtained by implicitly fitting an indicator function derived from an object (for example, mesh generation 203 shown in FIG. 10).

In a texture map step, a fine color appearance is generated for a 3D mesh by using a texture map. The texture map includes steps: collision detection, face marking, texture mapping, texture hole-filling, and seam elimination (for example, texture map 204 shown in FIG. 10).

In the collision detection step, visible or invisible results of all faces in a pose of a keyframe of each texture may be calculated based on a mesh model (triangle face information) and pose information of the keyframe. To improve efficiency of collision detection, a mesh is divided hierarchically based on a hierarchical binary tree data structure of a bounding box. To be specific, bounding boxes of triangle faces are calculated first, and then the mesh is divided based on spatial distribution characteristics of different bounding boxes.

In the face marking and texture mapping step, each face on the mesh model is marked by using a graph cuts method based on the results in the collision detection module and the mesh model, to determine a keyframe (i.e., Image View) selected by the face to generate a texture. A result of the face marking is used as an input of a texture mapping module, and is used to generate a texture map patch set.

In the texture hole-filling step, due to problems that a mesh and a pose are different from those in actual conditions, texture keyframe coverage may be missing, local shading exists during capture, and the like, optional keyframes may not be found for some triangle faces in the result of the face marking. In this case, a texture of an area that lacks an optional keyframe needs to be patched through the texture hole-filling.

In the seam elimination Seamless step, selection of the foregoing face is that a face of a mesh corresponds to one keyframe (i.e., view). A plurality of texture patches are formed due to a difference in pose color illumination intensity between different keyframes, and there are significantly unevenly colored seams at edges of the texture patches. In this case, these seams need to be processed to make a transition smoother.

In the foregoing manner, the 3D model of the target object may be constructed. In addition, because a distribution size of the sparse point cloud is consistent with the real size of the target object, the reconstructed 3D model is more realistic, and no size distortion occurs.

505: Receive the 3D model sent by the server.

After constructing the 3D model of the target object, the server may send the 3D model of the target object to the terminal device, and the terminal device may display the 3D model of the target object (for example, model display 104 shown in FIG. 10).

FIG. 11 is a flowchart of an embodiment of an object reconstruction method according to this disclosure. As shown in FIG. 11, the method in this embodiment may be performed by the server (for example, the server 200) in the foregoing embodiments. The object reconstruction method may include the following steps.

1101: Obtain a plurality of target images and a first pose corresponding to each target image, where the plurality of target images are captured by a terminal device for a target object based on a plurality of angles of view, the first pose indicates a real pose corresponding to a case in which the terminal device captures a corresponding target image, and the first pose is captured by a sensor on the terminal device.

In this embodiment of this disclosure, after obtaining the plurality of target images and the first pose corresponding to each target image, the terminal device may transfer, to the server, the plurality of target images and the first pose corresponding to each target image. Further, the server may construct a 3D model of the target object based on the plurality of target images and the first pose corresponding to each target image.

For more description of step 1101, refer to the description, in the foregoing embodiment, about obtaining, by the server, the plurality of target images and the first pose corresponding to each target image. Details are not described herein again.

1102: Determine, based on the plurality of target images, a second pose corresponding to each target image, and construct an initial sparse point cloud of the target object.

For more description of step 1102, refer to the description, in the foregoing embodiment, about determining, by the server based on the plurality of target images, the second pose corresponding to each target image, and constructs the initial sparse point cloud of the target object. Details are not described herein again.

1103: Determine a pose adjustment relationship based on the first pose and the second pose, and adjust location distribution of the initial sparse point cloud based on the pose adjustment relationship, to obtain a sparse point cloud of the target object, where a distribution size of the sparse point cloud of the target object is consistent with a real size of the target object.

For more description of step 1103, refer to the description, in the foregoing embodiment, about determining, by the server, the pose adjustment relationship based on the first pose and the second pose, and adjusting the location distribution of the initial sparse point cloud based on the pose adjustment relationship, to obtain the sparse point cloud of the target object. Details are not described herein again.

1104: Perform 3D reconstruction on the target object based on the sparse point cloud of the target object, to obtain the 3D model of the target object.

For more description of step 1104, refer to the description, in the foregoing embodiment, about performing, by the server, 3D reconstruction on the target object based on the sparse point cloud, to obtain the 3D model of the target object. Details are not described herein again.

In a possible implementation, the server may further receive the plurality of target images and the first pose corresponding to each target image that are sent by the terminal device.

In a possible implementation, the server may further send the 3D model of the target object to the terminal device.

In a possible implementation, the sensor is an inertial sensor IMU.

In a possible implementation, before the constructing an initial sparse point cloud of the target object, the server may further determine a pose association relationship between the plurality of target images based on the first pose corresponding to the target image, where a difference between real poses corresponding to a case in which the terminal device captures the plurality of target images between which there is the pose association relationship is less than a threshold.

In addition, the server may further construct the initial sparse point cloud of the target object through feature point matching based on images that are in the plurality of target images and between which there is the pose association relationship.

In a possible implementation, before the constructing an initial sparse point cloud of the target object, the server may further receive a pose association relationship between the plurality of target images that is sent by the terminal device, where a difference between real poses corresponding to a case in which the terminal device captures the plurality of target images between which there is the pose association relationship is less than a threshold.

In addition, the server may further construct the initial sparse point cloud of the target object through feature point matching based on images that are in the plurality of target images and between which there is the pose association relationship.

In a possible implementation, the plurality of target images meet at least one of the following conditions. Angle-of-view coverage of the plurality of target images for the target object is greater than a threshold, a degree of angle-of-view overlap between different target images in the plurality of target images is less than a threshold, and image definition of the plurality of target images is greater than a threshold.

This embodiment of this disclosure provides the object reconstruction method. The method includes obtaining the plurality of target images and the first pose corresponding to each target image, where the plurality of target images are captured by the terminal device for the target object based on the plurality of angles of view, the first pose indicates the real pose corresponding to a case in which the terminal device captures the corresponding target image, and the first pose is captured by the sensor on the terminal device, determining, based on the plurality of target images, the second pose corresponding to each target image, and constructing the initial sparse point cloud of the target object, determining the pose adjustment relationship based on the first pose and the second pose, and adjusting location distribution of the initial sparse point cloud based on the pose adjustment relationship, to obtain the sparse point cloud of the target object, where the distribution size of the sparse point cloud of the target object is consistent with the real size of the target object, and performing 3D reconstruction on the target object based on the sparse point cloud of the target object, to obtain the 3D model of the target object. According to the method, the distribution size of the sparse point cloud generated based on the first pose is consistent with the real size of the target object, so that the reconstructed 3D model is more realistic, and no size distortion occurs.

FIG. 12 is a schematic diagram of a structure of an object reconstruction apparatus according to an embodiment of this disclosure. The apparatus 1200 may include the following modules.

An obtaining module 1201 is configured to obtain a plurality of target images and a first pose corresponding to each target image, where the plurality of target images are captured by a terminal device for a target object based on a plurality of angles of view, the first pose indicates a real pose corresponding to a case in which the terminal device captures a corresponding target image, and the first pose is captured by a sensor on the terminal device.

For specific description of the obtaining module 1201, refer to the description of step 1101 in the foregoing embodiment. Details are not described herein again.

A point cloud construction module 1202 is configured to determine, based on the plurality of target images, a second pose corresponding to each target image, and construct an initial sparse point cloud of the target object, and determine a pose adjustment relationship based on the first pose and the second pose, and adjust location distribution of the initial sparse point cloud based on the pose adjustment relationship, to obtain a sparse point cloud of the target object, where a distribution size of the sparse point cloud of the target object is consistent with a real size of the target object.

For specific description of the point cloud construction module 1202, refer to the description of step 1102 and step 1103 in the foregoing embodiment. Details are not described herein again.

A reconstruction module 1203 is configured to perform 3D reconstruction on the target object based on the sparse point cloud, to obtain a 3D model of the target object.

For specific description of the reconstruction module 1203, refer to the description of step 1104 in the foregoing embodiment. Details are not described herein again.

In a possible implementation, the obtaining module 1201 is further configured to receive the plurality of target images and the first pose corresponding to each target image that are sent by the terminal device.

In a possible implementation, the apparatus further includes a sending module 1204 configured to send the 3D model of the target object to the terminal device.

In a possible implementation, the sensor is an inertial sensor IMU.

In a possible implementation, the obtaining module 1201 is further configured to, before the constructing an initial sparse point cloud of the target object, determine a pose association relationship between the plurality of target images based on the first pose corresponding to the target image, where a difference between real poses corresponding to a case in which the terminal device captures the plurality of target images between which there is the pose association relationship is less than a threshold.

The point cloud construction module 1202 is further configured to construct the initial sparse point cloud of the target object through feature point matching based on images that are in the plurality of target images and between which there is the pose association relationship.

In a possible implementation, the obtaining module 1201 is further configured to, before the constructing an initial sparse point cloud of the target object, receive a pose association relationship between the plurality of target images that is sent by the terminal device, where a difference between real poses corresponding to a case in which the terminal device captures the plurality of target images between which there is the pose association relationship is less than a threshold.

The point cloud construction module 1202 is further configured to construct the initial sparse point cloud of the target object through feature point matching based on images that are in the plurality of target images and between which there is the pose association relationship.

In a possible implementation, the plurality of target images meets at least one of the following conditions.

Angle-of-view coverage of the plurality of target images for the target object is greater than a threshold, a degree of angle-of-view overlap between different target images in the plurality of target images is less than a threshold, and image definition of the plurality of target images is greater than a threshold.

Figure 13:
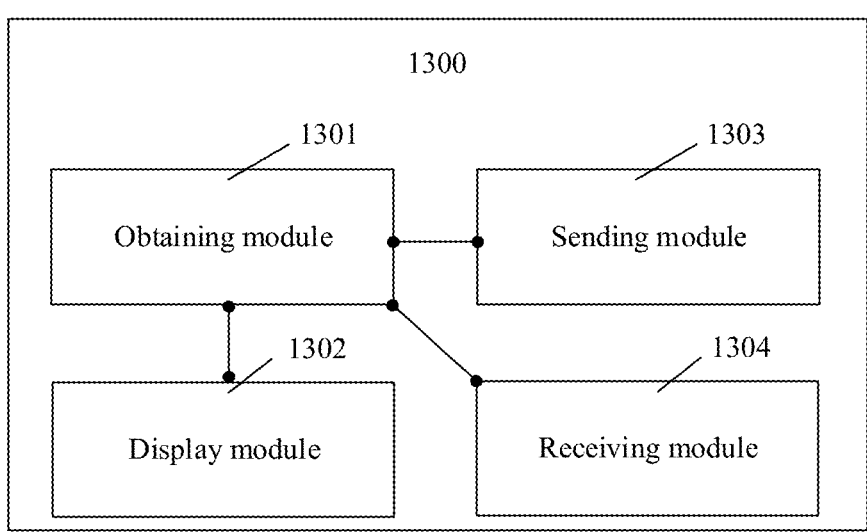
FIG. 13 is a schematic diagram of a structure of an object reconstruction apparatus according to an embodiment of this disclosure.

FIG. 13 is a schematic diagram of a structure of an object reconstruction apparatus according to an embodiment of this disclosure. The apparatus is used in a terminal device, and the terminal device includes a camera. The apparatus 1300 may include the following modules.

An obtaining module 1301 is configured to obtain a first image captured by the terminal device for a target object, and obtain a plurality of target images captured by controlling, by a user based on first guidance information displayed by a display module 1302, a pose of the terminal device, where each target image is captured from one of capture viewpoints.

For specific description of the obtaining module 1301, refer to the description of step 501 and step 503 in the foregoing embodiment. Details are not described herein again.

The display module 1302 is configured to display the first guidance information based on a location of the target object in the first image and a real pose corresponding to a case in which the terminal device captures the first image, where the first guidance information indicates a plurality of capture viewpoints, and the plurality of capture viewpoints are distributed around the target object.

For specific description of the display module 1302, refer to the description of step 502 in the foregoing embodiment. Details are not described herein again.

A sending module 1303 is configured to send, to a server, the plurality of target images and a first pose corresponding to each target image, where the first pose indicates a real pose corresponding to a case in which the terminal device captures a corresponding target image, the plurality of target images and the first pose corresponding to each target image are used to construct a 3D model of the target object, and the first pose is captured by a sensor on the terminal device.

For specific description of the sending module 1303, refer to the description of step 504 in the foregoing embodiment. Details are not described herein again.

A receiving module 1304 is configured to receive the 3D model sent by the server.

For specific description of the receiving module 1304, refer to the description of step 505 in the foregoing embodiment. Details are not described herein again.

In a possible implementation, the sensor is an inertial sensor IMU.

In a possible implementation, the plurality of capture viewpoints meets at least one of the following conditions.

Angle-of-view coverage of the plurality of capture viewpoints for the target object is greater than a threshold, and a degree of angle-of-view overlap between different capture viewpoints in the plurality of capture viewpoints is less than a threshold.

In a possible implementation, the obtaining module 1301 is further configured to determine a pose association relationship between the plurality of target images based on the first pose corresponding to each target image, where a difference between real poses corresponding to a case in which the camera captures the plurality of target images between which there is the pose association relationship is less than a threshold.

The sending module 1303 is further configured to send the pose association relationship between the plurality of target images to the server, where the pose association relationship between the plurality of target images is used to construct the 3D model of the target object.

Figure 14:
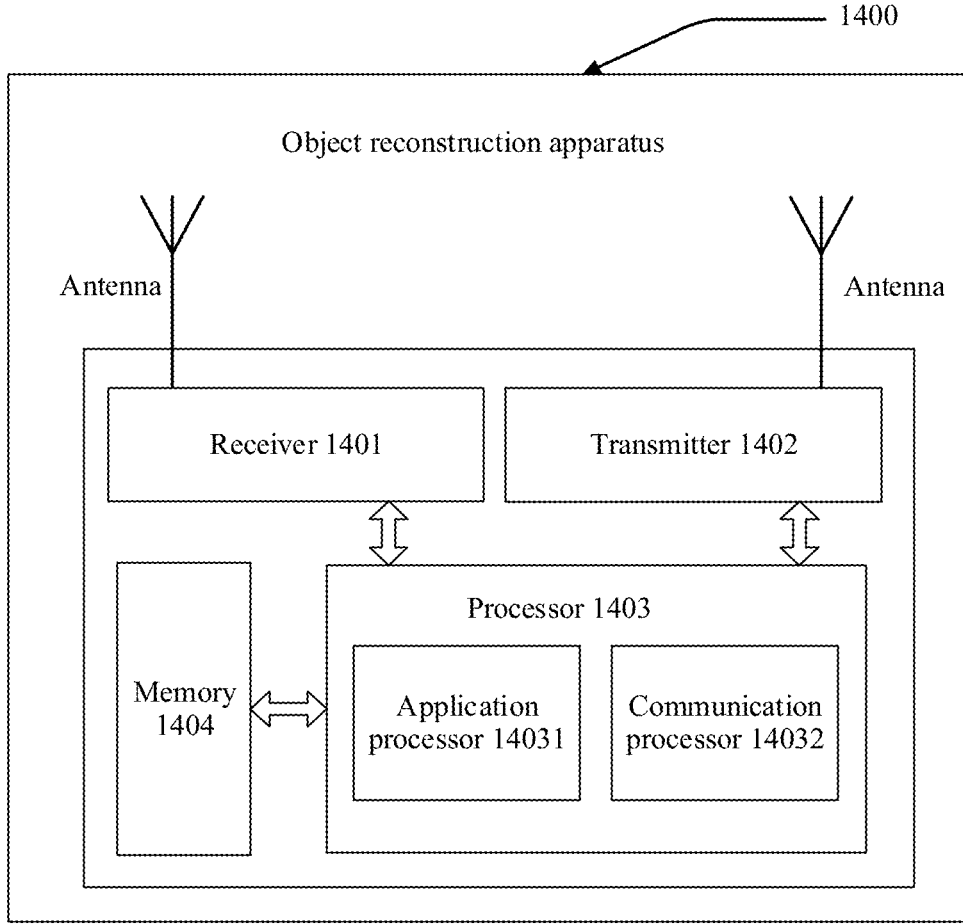
FIG. 14 is a schematic diagram of a structure of an object reconstruction apparatus according to an embodiment of this disclosure.

The following describes an object reconstruction apparatus 1400 according to an embodiment of this disclosure. The object reconstruction apparatus 1400 may include the object reconstruction apparatuses described in FIG. 12 and FIG. 13. FIG. 14 is a schematic diagram of a structure of the object reconstruction apparatus according to this embodiment of this disclosure. The object reconstruction apparatus 1400 may be further represented as a virtual reality VR device, a mobile phone, a tablet, a notebook computer, an intelligent wearable device, or the like. This is not limited herein. Further, the object reconstruction apparatus 1400 includes a receiver 1401, a transmitter 1402, a processor 1403, and a memory 1404 (there may be one or more processors 1403 in the object reconstruction apparatus 1400, and one processor is used as an example in FIG. 14). The processor 1403 may include an application processor 14031 and a communication processor 14032. In some embodiments of this disclosure, the receiver 1401, the transmitter 1402, the processor 1403, and the memory 1404 may be connected through a bus or in another manner.

The memory 1404 may include a read-only memory and a random access memory, and provide instructions and data to the processor 1403. Apart of the memory 1404 may further include a non-volatile RAM (NVRAM). The memory 1404 stores a processor and operation instructions, an executable module or a data structure, a subset thereof, or an extended set thereof. The operation instructions may include various operation instructions for implementing various operations.

The processor 1403 controls an operation of the object reconstruction apparatus. In a specific application, components of the object reconstruction apparatus are coupled together through a bus system. In addition to a data bus, the bus system may further include a power bus, a control bus, a status signal bus, and the like. However, for clear description, various types of buses in the figure are all referred to as the bus system.

The method disclosed in embodiments of this disclosure may be applied to the processor 1403, or may be implemented by the processor 1403. The processor 1403 may be an integrated circuit chip that has a signal processing capability. In an implementation process, the steps of the foregoing method may be completed by using a hardware integrated logic circuit in the processor 1403 or instructions in a form of software. The processor 1403 may be a general-purpose processor, a digital signal processor (DSP), a microprocessor, or a microcontroller, and may further include an ASIC, an FPGA or another programmable logic device, a discrete gate or a transistor logic device, or a discrete hardware component. The processor 1403 may implement or perform the method, steps, and logical block diagrams that are disclosed in embodiments of this disclosure. The general-purpose processor may be a microprocessor, or the processor may be any conventional processor or the like. The steps of the method disclosed with reference to embodiments of this disclosure may be directly performed and completed by a hardware decoding processor, or may be performed and completed by a combination of hardware and software modules in a decoding processor. A software module may be located in a mature storage medium in the art, for example, a RAM, a flash memory, a read-only memory (ROM), a programmable read-only memory, an electrically erasable programmable memory, or a register. The storage medium is located in the memory 1404. The processor 1403 reads information in the memory 1404, and completes the steps in the foregoing method in combination with hardware of the processor 1403. Further, the processor 1403 may read the information in the memory 1404, and complete step 501 to step 503 in the foregoing embodiment and step 1101 to step 1103 in the foregoing embodiment with reference to hardware of the processor 1403.

The receiver 1401 may be configured to receive input digital or character information, and generate a signal input related to setting and function control of the object reconstruction apparatus. The transmitter 1402 may be configured to output digital or character information through a first interface. The transmitter 1402 may be further configured to send instructions to a disk group through the first interface, to modify data in the disk group. The transmitter 1402 may further include a display device like a display.

An embodiment of this disclosure further provides a computer program product. When the computer program product runs on a computer, the computer is enabled to perform the steps of the object reconstruction method described in the embodiments corresponding to FIG. 5 and FIG. 11.

An embodiment of this disclosure further provides a computer-readable storage medium. The computer-readable storage medium stores a program for signal processing. When the program is run on a computer, the computer is enabled to perform the steps of the image processing method described in the foregoing embodiments.

The image display apparatus provided in embodiments of this disclosure may be further a chip. The chip includes a processing unit and a communication unit. The processing unit may be, for example, a processor. The communication unit may be, for example, an input/output interface, a pin, or a circuit. The processing unit may execute computer-executable instructions stored in a storage unit, so that the chip in an execution device performs the data processing method described in the foregoing embodiments, or the chip in a training device performs the data processing method described in the foregoing embodiments. Optionally, the storage unit is a storage unit in the chip, for example, a register or a buffer. Alternatively, the storage unit may be a storage unit that is in a wireless access device and that is located outside the chip, for example, a ROM, another type of static storage device that can store static information and instructions, or a RAM.

In addition, it should be noted that the described apparatus embodiments are merely examples. The units described as separate parts may or may not be physically separate, and parts displayed as units may or may not be physical units, may be located in one location, or may be distributed on a plurality of network units. Some or all the modules may be selected based on an actual requirement to achieve the objectives of the solutions of embodiments. In addition, in the accompanying drawings of the apparatus embodiments provided by this disclosure, connection relationships between modules indicate that the modules have communication connections with each other, which may be further implemented as one or more communication buses or signal cables.

Based on the descriptions of the foregoing implementations, a person skilled in the art may clearly understand that this disclosure may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. In addition, a specific hardware structure used to implement a same function may be in various forms, for example, in a form of an analog circuit, a digital circuit, or a dedicated circuit. However, as for this disclosure, a software program implementation is a better implementation in most cases. Based on such an understanding, the technical solutions of this disclosure essentially or a part contributing to the conventional technology may be implemented in a form of a software product. The computer software product is stored in a readable storage medium, for example, a floppy disk, a USB flash drive, a removable hard disk, a ROM, a RAM, a magnetic disk, or an optical disc of a computer, and includes several instructions for instructing a computer device (which may be a personal computer, a server, a network device, or the like) to perform the method in embodiments of this disclosure.

All or some of the foregoing embodiments may be implemented by using software, hardware, firmware, or any combination thereof. When software is used to implement embodiments, all or some of embodiments may be implemented in a form of a computer program product.

The computer program product includes one or more computer instructions. When the computer instructions are loaded and executed on the computer, the procedure or functions according to embodiments of this disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid-state drive (SSD)), or the like.

What is claimed is:

1. A method comprising:
   obtaining target images of a target object and a first pose corresponding to the target images, wherein the target images and first pose are based on angles of view, and wherein the first pose is a real pose;
   determining, based on the target images, a second pose corresponding to the target images;
   constructing, based on the target images, an initial sparse point cloud of the target object;

determining, based on the first pose and the second pose, a pose adjustment relationship;
   adjusting, based on the pose adjustment relationship, location distribution of the initial sparse point cloud to obtain a target sparse point cloud of the target object, wherein a distribution size of the target sparse point cloud is consistent with a real size of the target object; and
   performing, based on the target sparse point cloud, a three-dimensional (3D) reconstruction on the target object to obtain a 3D model of the target object.

2. The method of claim 1, further comprising capturing, by a sensor in a terminal device, the target images and the first pose.

3. The method of claim 2, further comprising sending, to the terminal device, the 3D model.

4. The method of claim 2, wherein the sensor is an inertial measurement unit (IMU).

5. The method of claim 4, further comprising:
   receiving, from the terminal device, a pose association relationship among the target images before constructing the initial sparse point cloud; and
   further constructing, through feature point matching based on first images that are in the target images and among which there is the pose association relationship, the initial sparse point cloud.

6. The method of claim 1, further comprising:
   calculating, based on the first pose, a pose association relationship among the target images before constructing the initial sparse point cloud, and
   further constructing, through feature point matching based on first images that are in the target images and among which there is the pose association relationship, the initial sparse point cloud.

7. The method of claim 1, wherein the target images meet a condition, and wherein the condition is that an angle-of-view coverage of the target images for the target object is greater than a threshold.

8. The method of claim 1, wherein the target images meet a condition, and wherein the condition is that a degree of angle-of-view overlap between different target images in the target images is less than a threshold.

9. The method of claim 1, wherein the target images meet a condition, and wherein the condition is that an image definition of the target images is greater than a threshold.

10. A method comprising:
   capturing a first image of a target object;
   displaying, based on a location of the target object in the first image and a first real pose corresponding to the first image, first guidance information indicating capture viewpoints distributed around the target object;
   obtaining target images that are based on the first guidance information and a first pose, wherein each target image is from one of the capture viewpoints;
   calculating, based on a second pose corresponding to the target images, a pose association relationship among the target images, wherein the second pose is a second real pose corresponding to a corresponding target image, and wherein the second pose is from a sensor;
   sending, to a server, the target images, the second pose, and the pose association relationship to construct a three-dimensional (3D) model of the target object; and
   receiving, from the server, the 3D model that is based on the target images, the pose association relationship, and the second pose.

11. The method of claim 10, wherein the sensor is an inertial measurement unit (IMU).

12. The method of claim 10, wherein an angle-of-view coverage of the capture viewpoints for the target object is greater than a first threshold.

13. The method of claim 10, wherein a degree of angle-of-view overlap between different capture viewpoints in the capture viewpoints is less than a second threshold.

14. An apparatus comprising:

a memory configured to store instructions; and one or more processors coupled to the memory and configured to execute the instructions to cause the apparatus to:

obtain target images of a target object and a first pose corresponding to the target images, wherein the target images are received from a terminal device, and are based on angles of view, wherein the first pose is a real pose received from the terminal device;

determine, based on the target images, a second pose corresponding to the target images;

construct, based on the target images, an initial sparse point cloud of the target object;

determine a pose adjustment relationship based on the first pose and the second pose;

adjust, based on the pose adjustment relationship, location distribution of the initial sparse point cloud to obtain a sparse point cloud of the target object, wherein a distribution size of the sparse point cloud is consistent with a real size of the target object; and perform, based on the sparse point cloud, a three-dimensional (3D) reconstruction on the target object to obtain a 3D model of the target object.

15. The apparatus of claim 14, wherein the one or more processors are further configured to execute the instructions to cause the apparatus to receive, from the terminal device, the target images and wherein the first pose is from a sensor of the terminal device.

16. The apparatus of claim 15, wherein the sensor is an inertial measurement unit (IMU).

17. The apparatus of claim 16, wherein the one or more processors are further configured to execute the instructions to cause the apparatus to:

receive, from the terminal device, a pose association relationship among the target images before constructing the initial sparse point cloud of the target object; and further construct, through feature point matching based on first images that are in the target images and between which there is the pose association relationship, the initial sparse point cloud.

18. The apparatus of claim 14, wherein the one or more processors are further configured to execute the instructions to cause the apparatus to send, to the terminal device, the 3D model.

19. The apparatus of claim 14, wherein the one or more processors are further configured to execute the instructions to cause the apparatus to:

determine, based on the first pose, a pose association relationship among the target images before constructing the initial sparse point cloud; and further construct, through feature point matching based on first images that are in the target images and between which there is the pose association relationship, the initial sparse point cloud.

20. The apparatus of claim 14, wherein the target images meet at least one of the following conditions:

an angle-of-view coverage of the target images for the target object is greater than a first threshold;

a degree of angle-of-view overlap between different target images in the target images is less than a second threshold; or an image definition of the target images is greater than a third threshold.

\* \* \* \* \*